US012762220B2

(12) United States Patent
Shirai et al.

(10) Patent No.: US 12,762,220 B2
(45) Date of Patent: *Oct. 13, 2026

(54) INFORMATION PROCESSING SYSTEM, INFORMATION PROCESSING METHOD, ONE OR MORE NON-TRANSITORY COMPUTER-READABLE STORAGE MEDIA HAVING INFORMATION PROCESSING PROGRAM STORED THEREIN

(71) Applicant: NINTENDO CO., LTD., Kyoto (JP)

(72) Inventors: Tatsuhiro Shirai, Kyoto (JP); Takayuki Ohnishi, Kyoto (JP); Norihiro Kozawa, Kyoto (JP); Yohei Fushii, Kyoto (JP); Shoya Ota, Kyoto (JP); Hitoshi Sakai, Kyoto (JP); Yusuke Ido, Kyoto (JP); Yasunari Umano, Kyoto (JP); Eugene Borisov, Redmond, WA (US); Vijay Ganesan, Redmond, WA (US); Theowen Le Maitre, Paris (FR); Sylvain Gaeremynck, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,409

(22) Filed: May 28, 2025

(65) Prior Publication Data

US 2026/0080047 A1 Mar. 19, 2026

Related U.S. Application Data

(63) Continuation of application No. PCT/JP2024/045374, filed on Dec. 23, 2024.

(30) Foreign Application Priority Data

Sep. 13, 2024 (WO) .................. PCT/JP2024/032928
Dec. 5, 2024 (WO) .................. PCT/JP2024/043100

(51) Int. Cl.
*G06F 21/00* (2013.01)
*G06F 21/44* (2013.01)
*G06F 21/64* (2013.01)

(52) U.S. Cl.
CPC .............. *G06F 21/44* (2013.01); *G06F 21/64* (2013.01); *G06F 2221/2103* (2013.01)

(58) Field of Classification Search
CPC ... G06F 21/44; G06F 21/64; G06F 2221/2103
See application file for complete search history.

(56) References Cited

U.S. PATENT DOCUMENTS 8,285,999 B1 10/2012 Ghose
10,505,743 B1 12/2019 Maeng
(Continued)

FOREIGN PATENT DOCUMENTS

CN 107493171 12/2017
CN 111740995 10/2020
(Continued)

OTHER PUBLICATIONS

RFC Editor, "RFC7616", online, searched on Aug. 29, 2024, Internet (URL: https://www.rfc-editor.org/info/rfc7616), 32 pages.
(Continued)

*Primary Examiner* — Rodman Alexander Mahmoudi
(74) *Attorney, Agent, or Firm* — Nixon & Vanderhye PC

(57) ABSTRACT

A server issues challenge data and transmits the challenge data to a client. The client stores a first parameter, receives the challenge data, generates response data from the challenge data using a response key on the client side, and transmits the response data and the first parameter to the server. The server further receives the response data and the first parameter, specifies seed data for calculation for setting a response key on the server side, using the first parameter, sets the response key on the server side by executing the
(Continued)

calculation using the seed data, verifies the response data using the challenge data and the response key on the server side, and notifies a result thereof. The client receives the result.

20 Claims, 29 Drawing Sheets

(56) References Cited

U.S. PATENT DOCUMENTS

| | | | |
|---|---|---|---|
| 2006/0205388 A1 | 9/2006 | Semple et al. | |
| 2008/0228867 A1 | 9/2008 | Murphy | |
| 2009/0300364 A1 | 12/2009 | Schneider | |
| 2010/0070766 A1 | 3/2010 | Lu | |
| 2010/0174907 A1 | 7/2010 | Semple et al. | |
| 2011/0238972 A1 | 9/2011 | Semple et al. | |
| 2013/0010957 A1 | 1/2013 | Yu | |
| 2015/0100789 A1 | 4/2015 | Born | |
| 2015/0172281 A1 | 6/2015 | Joshi | |
| 2016/0261416 A1 | 9/2016 | Miller | |
| 2016/0306829 A1 | 10/2016 | Agrawal | |
| 2019/0116049 A1 | 4/2019 | Ittogi et al. | |
| 2019/0258493 A1 | 8/2019 | Colombo | |
| 2020/0052905 A1 | 2/2020 | Mathias et al. | |
| 2020/0162271 A1 | 5/2020 | Combou | |
| 2021/0392004 A1 | 12/2021 | Kim | |
| 2022/0029796 A1 | 1/2022 | Peddada et al. | |
| 2022/0078029 A1 | 3/2022 | Galdo et al. | |
| 2022/0131688 A1* | 4/2022 | Peddada | H04L 9/3247 |
| 2022/0247555 A1* | 8/2022 | Gullberg | H04L 9/0866 |
| 2024/0227730 A1 | 7/2024 | Matsushita | |
| 2024/0303638 A1 | 9/2024 | Osborn et al. | |
| 2024/0340164 A1* | 10/2024 | Lehtovirta | H04L 9/0643 |

FOREIGN PATENT DOCUMENTS

| | | |
|---|---|---|
| CN | 114125833 | 3/2022 |
| CN | 116097615 | 5/2023 |
| CN | 116235460 | 6/2023 |
| EP | 0998073 | 5/2000 |
| EP | 2 259 539 | 12/2010 |
| GB | 2522445 | 7/2015 |
| JP | 2005301577 A | 10/2005 |
| JP | 2008-530861 | 8/2008 |
| JP | 2012-073779 | 4/2012 |
| JP | 2017-079419 | 4/2017 |
| JP | 2019-075774 | 5/2019 |
| JP | 2023-049594 | 4/2023 |
| KR | 20220091578 | 6/2022 |
| WO | 9934554 | 7/1999 |
| WO | 0072506 | 11/2000 |
| WO | 2015/054086 | 4/2015 |
| WO | 2018/160863 | 9/2018 |
| WO | 2024/186977 | 9/2024 |

OTHER PUBLICATIONS

International Search Report for PCT/JP2024/045374, mailed Feb. 25, 2025, 5 pages.

Feb. 25, 2025 Written Opinion issued in International Patent Application No. PCT/JP2024/045374, pp. 1-5.

Shirai et al., U.S. Appl. No. 19/319,685, filed Sep. 4, 2025.

R. Shekh-Yusef, et al., “HTTP Digest Access Authentication”, Internet Standards Track, Online, Sep. 2015, 32 pages, at URL: https://www.rte-editor.org/info/rfc7616.

International Search Report and Written Opinion of the ISA for PCT/JP2024/032928, mailed Dec. 3, 2024, 11 pages.

U.S. Appl. No. 19/221,400, filed May 28, 2025.

U.S. Appl. No. 19/220,977, filed May 28, 2025.

International Search Report and Written Opinion of the ISA for PCT/JP2024/043100, mailed Feb. 26, 2025, 5 pages.

Paral et al., “Reliable and efficient PUF-based key generation using pattern matching,” 2011 IEEE International Symposium on Hardware-Oriented Security and Trust, San Diego, CA, USA, 2011, pp. 128-133, doi: 10.1109/HST.2011.5955010. (Year: 2011).

Huth et al., “Securing systems on the Internet of Things via physical properties of devices and communications,” 2015 Annual IEEE Systems Conference (SysCon) Proceedings, Vancouver, BC, Canada, 2015, pp. 8-13, doi:10.1109/SYSCON.2015.7116721. (Year: 2015).

Yang et al., “A Certificateless Two-Party Key Agreement Protocol from Challenge-Response Signatures,” 2012 8th International Conference on Wireless Communications, Networking and Mobile Computing, Shanghai, China, 2012, pp. 1-5, doi: 10.1109/WiCOM.2012.6478268. (Year: 2012).

Zhang et al., “Terminal ID Authentication System Based on Digital Certificate,” 2023 International Conference on Data Science & Informatics (ICDSI), Bhubaneswar, India, 2023, pp. 111-115, doi: 10.1109/ICDS160108.2023.00031. (Year: 2023).

Shirai, U.S. Appl. No. 19/376,167, filed Oct. 31, 2025.

Apr. 10, 2026 Seach Report issued in European Patent Application No. 24892481.3, pp. 1-10.

Feb. 9, 2026 Search Report issued in European Patent Application No. 25201765.2, pp. 1-10.

Apr. 2, 2026 Search Report issued in European Patent Application No. 24892479.7, pp. 1-10.

Apr. 10, 2026 Search Report issued in European Patent Application No. 24892480.5, pp. 1-11.

Simeng et al., Journal of Computer Research and Development, “Deduplication on Encrypted Data Based on Zero-Knowledge Proof and Key Transmission,” 2018; pp. 1222-1235.

* cited by examiner

FIG. 10

SV404

| FIRST SPECIFICATION PARAMETER (D11) | SECOND SPECIFICATION PARAMETER (D19) | COUNTER VALUE (D02) |
|---|---|---|
| 01 | 1.00 | 0 |
| 01 | 2.00 | 1 |
| 01 | 3.00 | 2 |
| 02 | 1.00 | 0 |
| 02 | 2.00 | 1 |
| 02 | 3.00 | 2 |
| ⋮ | ⋮ | ⋮ |

FIG. 11

SV405

| FIRST SPECIFICATION PARAMETER (D11) | SECOND SPECIFICATION PARAMETER (D19) | SECOND KDF SEED DATA (D04) |
|---|---|---|
| 01 | 1.00 | 0010110101 |
| 01 | 2.00 | 0110111101 |
| 02 | 1.00 | 0110111100 |
| 02 | 2.00 | 0110110110 |
| ⋮ | ⋮ | ⋮ |

INFORMATION PROCESSING SYSTEM, INFORMATION PROCESSING METHOD, ONE OR MORE NON-TRANSITORY COMPUTER-READABLE STORAGE MEDIA HAVING INFORMATION PROCESSING PROGRAM STORED THEREIN

CROSS REFERENCE TO RELATED APPLICATION

This application is a continuation of International Application No. PCT/JP2024/045374, filed Dec. 23, 2024 which designated the U.S. and claims priority to PCT/JP2024/043100 filed Dec. 5, 2024, and PCT/JP2024/032928 filed Sep. 13, 2024, the entire contents of each of which are hereby incorporated herein by reference.

FIELD

The present disclosure relates to a device authentication method that uses a challenge & response method.

BACKGROUND AND SUMMARY

An authentication method using a challenge & response method has been known as a method for authenticating a client device.

As for the device authentication method that uses a challenge & response method, there is room for providing a new method.

In view of the above, the following configuration examples can be exemplified, for example.

(Configuration 1)

Configuration 1 is directed to an information processing system comprising a client and a server connected to a network, the information processing system performing an authentication process on the client according to a challenge & response method between the client and the server, the server comprising
- one or more processors, and
- one or more memories storing instructions that, when executed, cause the one or more processors to perform a first set of operations comprising issuing challenge data and transmitting the challenge data to the client, the client comprising
- one or more processors, and
- one or more memories storing a first parameter and instructions that, when executed, cause the one or more processors to perform a second set of operations comprising
  - receiving the challenge data,
  - generating response data from the challenge data, using a response key on the client side, and
  - transmitting the response data and the first parameter to the server (which means a group of servers, and may be a server device different from a server device that issues the challenge data and transmits the challenge data to the client), the first set of operations further comprising
- receiving the response data and the first parameter,
- specifying seed data for calculation for setting a response key on the server side, using the first parameter.
- setting the response key on the server side by executing the calculation using the specified seed data,

- verifying the response data using the challenge data and the response key on the server side, and
- notifying the client of a result of the verification, and the second set of operations further comprising receiving the result of the verification.

According to the above configuration, since the parameter stored in the client is transmitted to the server, the seed data is specified on the server side using the parameter, and the response key on the server side is set, the response key can be a response key corresponding to the client. This configuration can also be applied even when the seed data is confidential.

(Configuration 2)

In Configuration 2 based on Configuration 1 above, the second set of operations may further include setting of the response key on the client side without using the first parameter.

(Configuration 3)

In Configuration 3 based on Configuration 1 or 2 above, the first parameter may be data with a signature of at least the first parameter, and the specifying the seed data may include verifying the signature.

(Configuration 4)

In Configuration 4 based on Configuration 3 above, a second parameter without signature may be further stored in the one or more memories in the client, the second set of operations may further include transmitting the second parameter to the server, the first set of operations may further include receiving the second parameter, and the specifying the seed data may include using the first parameter and the second parameter.

According to the above configuration, the seed data can be specified from a plurality of different aspects using the signed parameter and the non-signed parameter.

(Configuration 5)

In Configuration 5 based on Configuration 4 above, data defining a correspondence between a combination of the first parameter and the second parameter and the seed data may be further stored in the one or more memories in the server, and the specifying the seed data may include using the defining data.

(Configuration 6)

In Configuration 6 based on Configuration 4 above, the calculation may include a first calculation and a second calculation, calculation result data of the first calculation may be further stored in the one or more memories in the client, the second set of operations may further include transmitting the calculation result data to the server, the first set of operations may further include receiving the transmitted calculation result data, and the setting of the response key on the server side may include executing the second calculation using the specified seed data and the calculation result data.

According to the above configuration, as for at least a part of the calculation for setting the response key on the server side, calculation on the server side can be omitted. For example, even in the case where a value, a calculation formula, etc., used in the calculation are different depending on the client, an increase in information processing on the server side can be suppressed. In addition, even in the case where a value, a calculation formula, etc., used in the calculation are different or not different depending on the client, by causing the server not to have various data (key data, seed data, etc.) used in the first calculation, the risk of such data leaking from the server can be reduced.

(Configuration 7)

In Configuration 7 based on Configuration 6 above, the calculation result data and the first parameter may be data with a signature of at least these data, and the setting of the response key on the server side may further include verifying the signature.

(Configuration 8)

In Configuration 8 based on Configuration 1 above, a communication session for the authentication process between the server and the client may include a first communication session in which transmission and reception of the challenge data are performed, and a second communication session that is a communication session different from the first communication session and in which transmission and reception of the response data, verification of the response data, and transmission and reception of a result thereof are performed, and a server device for the first communication session and a server device for the second communication session may be permitted to be different.

(Configuration 9)

In Configuration 9 based on Configuration 8 above, the second set of operations may further include transmitting the received challenge data to the server, the first set of operations may further include receiving the challenge data, and the verifying the received response data may include using the received challenge data and the response key on the server side.

(Configuration 10)

In Configuration 10 based on Configuration 1 above, the first parameter may be a value different depending on the client.

(Configuration 11)

In Configuration 11 based on Configuration 3 above, the first parameter and the second parameter may be values different depending on the client.

(Configuration 12)

Configuration 12 is directed to one or more non-transitory computer-readable storage media storing instructions that, when executed, cause a client computer in a server and client system performing an authentication process according to a challenge & response method with a server to perform operations comprising:

- receiving challenge data from the server;
- generating response data from the challenge data using a response key on the client side;
- transmitting the response data to the server;
- transmitting a first parameter for specifying seed data for calculation for setting a response key on the server side to the server; and
- receiving, from the server, an authentication result based on a result of verification of the response data performed by specifying seed data for calculation for setting the response key on the server side, based on the first parameter.

(Configuration 13)

In Configuration 13 based on Configuration 12 above, the operations may further include setting of the response key on the client side without using the first parameter.

(Configuration 14)

In Configuration 14 based on Configuration 12 or 13 above, the first parameter may be data with a signature of at least the first parameter.

(Configuration 15)

In Configuration 15 based on Configuration 14 above, the operations may further include transmitting a second parameter without signature for specifying seed data for calculation for setting a response key on the server side to the server.

(Configuration 16)

In Configuration 16 based on Configuration 15 above, the operations may further include transmitting a calculation result data of the first calculation to the server, the first calculation being a part of the calculation for setting a response key on the server side, and the setting of the response key on the server side may include executing a second calculation using the specified seed data and the calculation result data, the second calculation being another part of the calculation for setting a response key on the server side.

(Configuration 17)

In Configuration 17 based on Configuration 16 above, the calculation result data and the first parameter may be data with a signature of at least these data.

(Configuration 18)

In Configuration 18 based on Configuration 12, the first parameter may be a value different depending on the client.

(Configuration 19)

In Configuration 19 based on Configuration 15, the first parameter and the second parameter may be values different depending on the client.

(Configuration 20)

Configuration 20 is directed to a computer-implemented method for performing, between a client and a server connected to a network, an authentication process on the client according to a challenge & response method, the computer-implemented method comprising:

- the server performing operations comprising issuing challenge data and transmitting the challenge data to the client,
- the client performing operations comprising
  - receiving the challenge data,
  - generating response data from the challenge data, using a response key on the client side, and
  - transmitting the response data and a first parameter to the server,
- the server further performing operations comprising
  - receiving the response data and the first parameter,
  - specifying seed data for calculation for setting a response key on the server side, using the first parameter.
  - setting a response key on the server side by executing the calculation using the specified seed data,
  - verifying the response data using the challenge data and the response key on the server side, and
  - notifying the client of a result of the verification, and
- the client further performing operations comprising receiving the result.

BRIEF DESCRIPTION OF THE DRAWINGS

FIG. 10 shows a non-limiting example of the data structure of a counter value specification table SV404;

FIG. 11 shows a non-limiting example of the data structure of a second KDF seed data specification table SV405;

DETAILED DESCRIPTION OF NON-LIMITING EXAMPLE EMBODIMENTS

Hereinafter, an exemplary embodiment will be described.

The exemplary embodiment relates to a process for device authentication. In the exemplary embodiment, a process of performing device authentication before providing a predetermined communication service to a device or enabling a device to perform a predetermined function (more specifically, for example, before providing an online service (for example, online games, matching opponents, accessing online shops (download sites for software and contents), etc.)) will be described as an example. In the device authentication, authenticity of a client device (hereinafter referred to simply as client) is confirmed.

Figure 1:
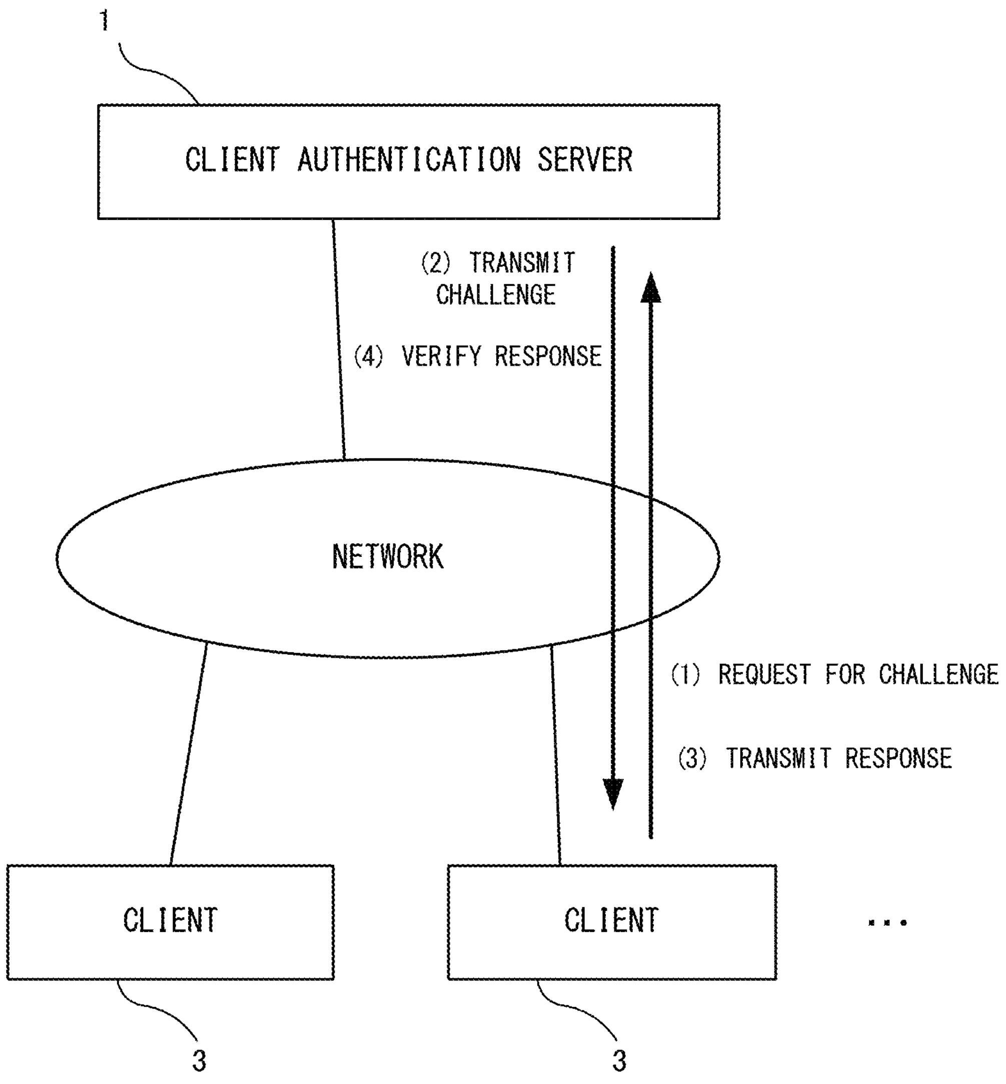
FIG. 1 is a schematic diagram showing a non-limiting example of the overall configuration of a system of an exemplary embodiment.

In the exemplary embodiment, a challenge & response method is used as a device authentication method. In this method, authentication is performed in the following manner. First, FIG. 1 schematically shows the overall configuration of an authentication processing system according to the exemplary embodiment. In FIG. 1, a client authentication server (hereinafter referred to simply as server) 1 and a client device (hereinafter referred to simply as client) 3 are connected via a network. The server 1 may be composed of a plurality of server devices. In such a configuration, first, (1) the client 3 that wishes to start an online game requests the server 1 (which is different from a server that provides the online game, in the exemplary embodiment) to transmit challenge data. (2) In response to the request, the server 1 generates challenge data and transmits the challenge data to the client 3. (3) The client 3 performs a predetermined calculation process, based on the challenge data, to generate response data and transmits the response data to the server 1. (4) The server 1 verifies the response data received from the client 3 and transmits predetermined data corresponding to a success or failure of the verification, thereby performing verification for the authenticity of the client 3. In the case of a server composed of a plurality of server devices, a server device that performs the process in (2) above and a server device that performs the process in (4) above may be permitted to be different.

Next, an outline of a device authentication process (hereafter referred to simply as authentication process) using a challenge & response method in the exemplary embodiment will be described. First, a "response key" used in the authentication process will be described.

[Response Key]

The response key is key data used in a process of creating response data. The response data is generated by performing calculation using this response key on the challenge data received from the server 1.

Figure 2:
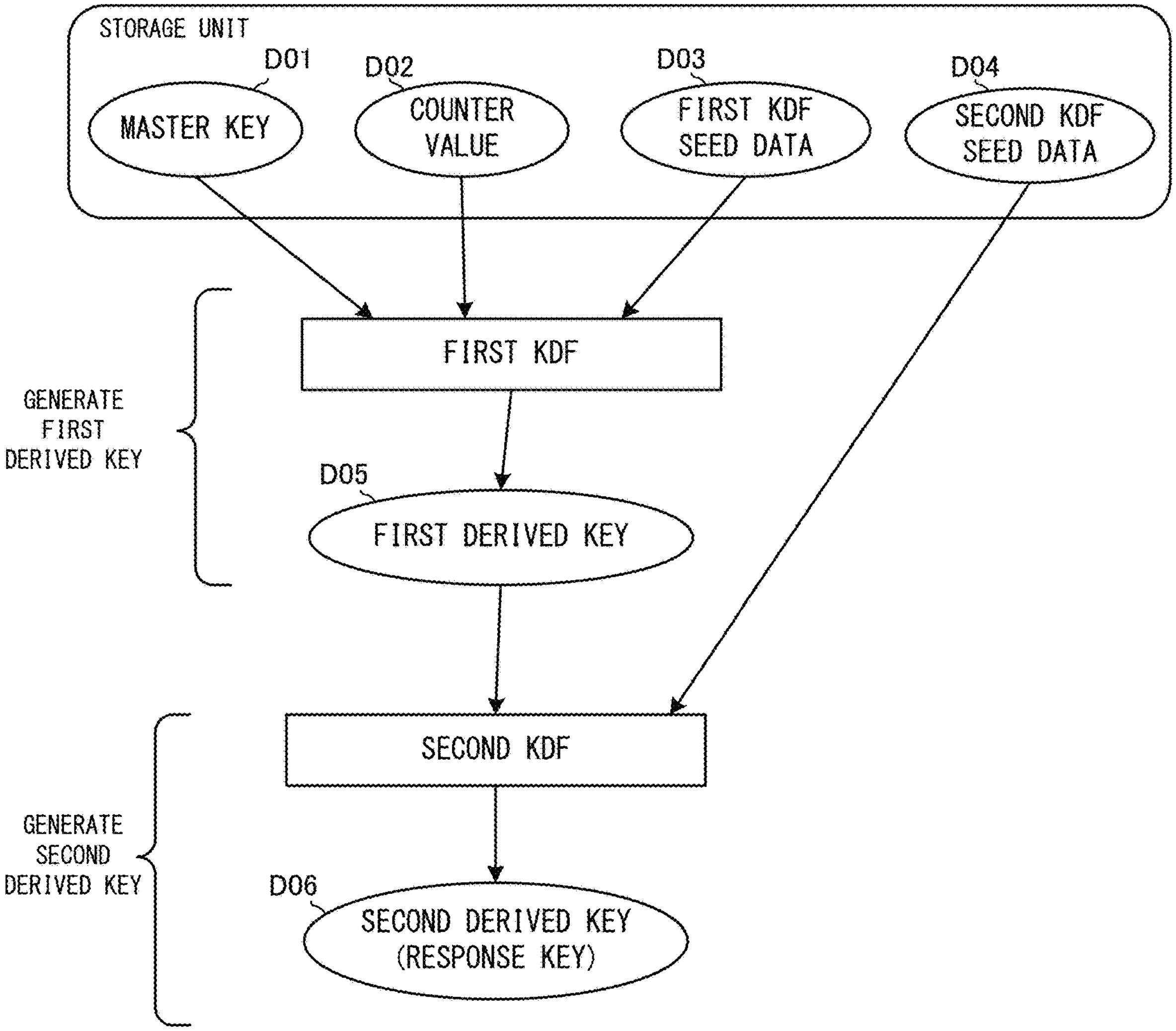
FIG. 2 is a diagram for describing a non-limiting example of an outline of a response key setting process.

FIG. 2 is a diagram for describing an outline of a response key setting process in the exemplary embodiment and schematically shows the flow of data in this process. In FIG. 2, elements indicated by ovals represent data/parameter elements, and elements indicated by rectangles represent processing elements. For convenience of description, in FIG. 2, the data/parameter elements are designated by reference characters in the form of "Dnn (where nn is an integer)". The same type of diagram will appear later, and data/parameter elements therein are designated by reference characters in the same manner.

In the example shown in FIG. 2, key data is generated from predetermined data using a key derivation function (hereinafter referred to as KDF), and the generated key data is set as the response key. Here, the KDF is a function for generating another key, based on key data. When the key data and predetermined data called seed data are inputted into the KDF, another key data based on these data is generated. Hereinafter, the key data outputted by the KDF is referred to as "derived key". In the exemplary embodiment, derived key data generated using multiple stages of KDF (two stages of KDF in the exemplary embodiment) is used as the response key. In the following description, the first-stage KDF is referred to as "first KDF", the second-stage KDF is referred to as "second KDF", key data outputted by the first KDF is referred to as "first derived key data" or simply as "first derived key", and key data outputted by the second KDF is referred to as "second derived key data" or simply as "second derived key". The content of the calculation of each KDF may be any content, and examples of the KDFs include KDFs that use HMAC or CMAC as PRF, KDFs that use hash functions or block ciphers, etc. In addition, the content of the calculation of each stage KDF may be the same or different.

The flow of response key setting will be described using FIG. 2. A response key setting process is executed in each of the server and the client, but in the exemplary embodiment, as will be described later, there are differences between the response key setting process executed in the server and the response key setting process executed in the client. With reference to FIG. 2, the response key setting process executed in the client 3 will be described. A response key set in the client 3 is sometimes referred to as "response key (client)", and a response key set in the server 1 is sometimes referred to as "response key (server)". In addition, a second derived key calculated in the client 3 is sometimes referred to as "second derived key (client)", and a second derived key calculated in the server 1 is sometimes referred to as "second derived key (server)".

First, a master key D01, a counter value D02, first KDF seed data D03, and second KDF seed data D04 are stored in a storage unit of the client 3. The master key D01 is key data to be inputted into the first KDF. The master key D01 may be configured as fixed value data or may be configured as changeable data. In addition, the master key D01 may be data different for each client. When the client is implemented using emulator technology, the master key D01 may be the same data as the master key of the target to be emulated.

Each of the counter value D02, the first KDF seed data D03, and the second KDF seed data D04 is used as KDF seed data. The counter value D02 can be a value different depending on the client 3. The counter value D02 is, for example, a value that can be changed in response to system update of the client 3, etc., and is specifically incremented by 1 at a time. In the exemplary embodiment, the case where the counter value can be any of four values from 0 to 3 will be described as an example. In addition, in the exemplary embodiment, the counter value D02 is initially 0.

The first KDF seed data D03 is seed data to be inputted into the first KDF and can be a value different depending on the client 3. The second KDF seed data D04 is seed data to be inputted into the second KDF and can be a value different depending on the client 3. These seed data may be any data, but for example, the first KDF seed data D03 may be a fixed value, and more specifically, the first KDF seed data D03 may be, for example, identification data that indicates a certain characteristic of the client 3. For example, the first KDF seed data D03 may be identification data that indicates a development machine or a product machine. When the client is implemented using emulator technology, the identification data may be data that indicates a characteristic of the target to be emulated. In addition, the second KDF seed data D04 may be data that can be set or changed by the client 3 itself or in response to an instruction from the outside such as a server. More specifically, for example, the second KDF seed data D04 may be identification data that indicates another characteristic of the client 3 (for example, data that indicates security settings). In addition, the second KDF seed data D04 may be data that differs depending on the system version (data that is updated by a version upgrade). When the client is implemented using emulator technology, the identification data may be data that indicates a characteristic of the target to be emulated. Each of the KDF seed data D03 and D04 may be changed by updating the system software, for example. In addition, the first KDF seed data D03 and the second KDF seed data D04 may both be values different for each client.

Of these data, first, the master key D01, the (current) counter value D02, and the first KDF seed data D03 are inputted into the first KDF. As a result, a "first derived key" D05 that is a derived key outputted by first KDF calculation is generated.

Next, the second KDF seed data D04 is inputted into the second KDF together with the generated first derived key D05. Accordingly, a "second derived key (client)" D06 that is a derived key outputted by second KDF calculation is generated.

In the exemplary embodiment, the second derived key (client) D06 is used as the response key (client). That is, in the exemplary embodiment, the response key (client) is set by generating the second derived key and is used in a process of generating a response data set D103 described later.

The calculation of each KDF in the response key setting process may be executed at runtime (i.e., each time the authentication process is performed), but the results of the calculation may be stored in advance and may be read when the authentication process is to be performed, whereby the calculation of each KDF may be set not to be executed each time the authentication process is performed. For example, the first derived key data and/or the second derived key data may be calculated and stored, for example, when the system of the client 3 is started up, and the response key may be set by reading the first derived key data and/or the second derived key data when the authentication process is to be performed. Alternatively, for example, the calculated data (the first derived key data and/or the second derived key data) may be acquired from the outside and stored in advance, and the response key may be set by reading the calculated data when the authentication process is to be performed. In addition, one of the calculation of the first KDF and the calculation of the second KDF may be performed at runtime, and as for the other, pre-calculated data may be read.

As described above, in the exemplary embodiment, the response key setting process executed in the server 1 and the response key setting process executed in the client 3 are different. One of the differences is that a first KDF calculation process is not executed in the response key setting process performed in the server 1. More specifically, calculated data (first derived key data; in the exemplary embodiment, encrypted first derived key data as described later) that is a result obtained by executing the calculation of the first KDF is written to the storage unit of the client 3 in advance (before the authentication process is started, for example, in a setting process in the client 3 performed in advance). Then, when the authentication process is to be performed, the calculated data is transmitted from the client 3 to the server 1, and the server 1 executes the calculation of the second KDF using the calculated data, without executing the calculation of the first KDF, to set the response key. In this example, as described above, the calculated data is included in client certification data (hereinafter referred to simply as certification data).

Figure 3:
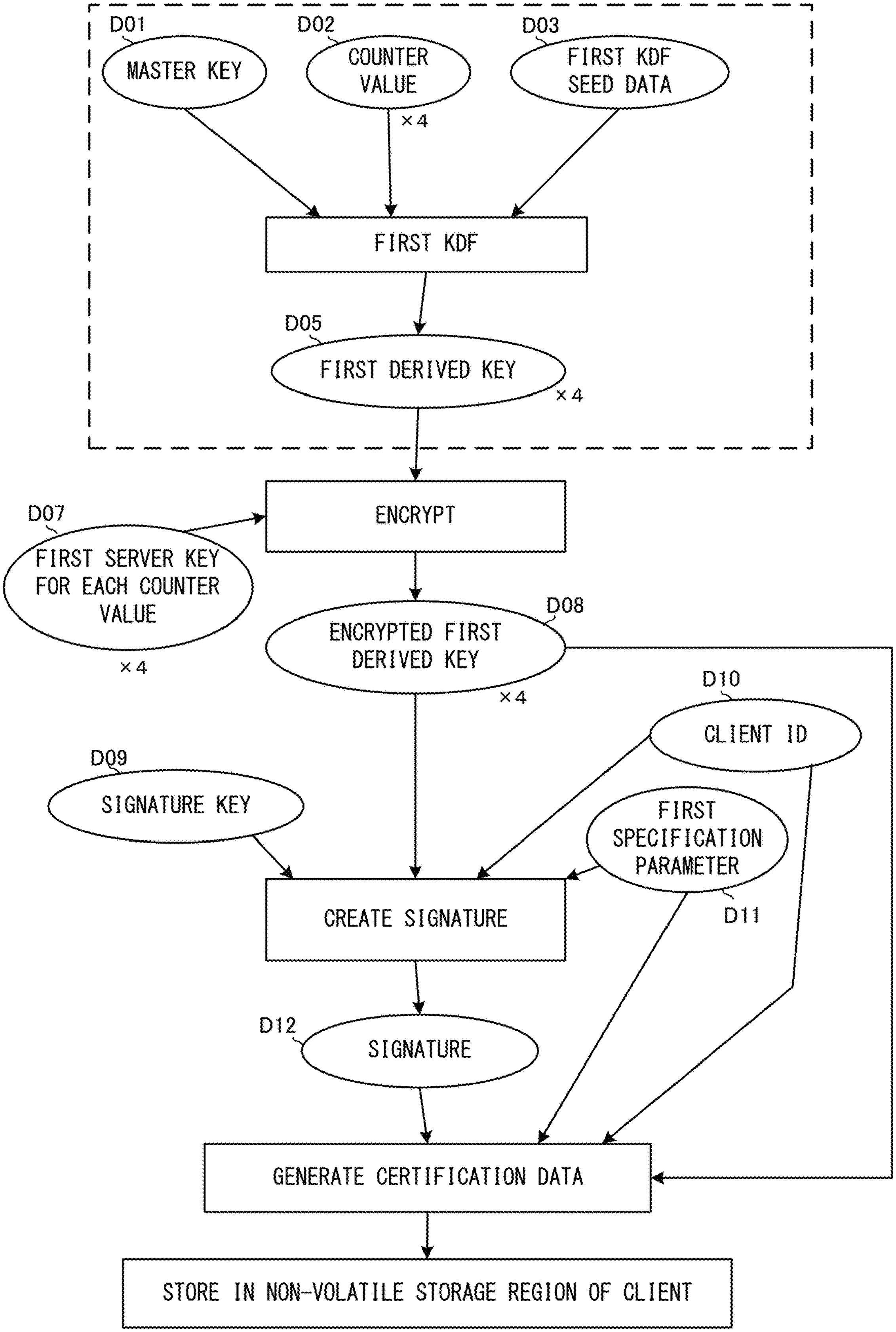
FIG. 3 is a diagram showing a non-limiting example of an outline of a certification creation process.

Here, a method for generating the certification data will be described. In the client 3, the above certification data is stored in advance (before the authentication process is started). The certification data is written to the storage unit (described later) of the client 3 when the setting process in the client 3 is performed. FIG. 3 is a diagram schematically showing an outline of a certification creation process when a writing process is executed by a PC (hereinafter referred to as PC 4). In FIG. 3, first, the master key D01, the counter value D02, and the first KDF seed data D03 of the client 3 to be manufactured are inputted into the first KDF. Accordingly, the first derived key D05 is generated. The master key D01 may be read from the client 3 connected to the PC 4 and targeted for the process of writing the certification data, for example. Here, as described above, in the exemplary embodiment, there are four possible values for the counter value D02. Therefore, the calculation of the first KDF in the PC 4 is performed for each possible value (0 to 3) for the counter value D02, and the first derived key D05 corresponding to each value for the counter value D02 is generated. That is, in this example, four first derived keys D05 are generated. In the following, when these four first derived keys D05 are individually represented, the four first derived keys D05 are represented as a first derived key (when the counter value is 0) D05A, a first derived key (when the counter value is 1) D05B, a first derived key (when the counter value is 2) D05C, and a first derived key (when the counter value is 3) D05D.

Next, a process of encrypting each first derived key D05 is performed. Specifically, a process of encrypting each first derived key D05 using a first server key D07 that is an encryption key is performed. In the following, the encrypted first derived key D05 is referred to as "encrypted first derived key" D08. In addition, in the exemplary embodiment, the first server key D07 is prepared to be different for each counter value D02. In the following, the first server key D07 used when the counter value D02 is 0 is represented as a "first server key (when the counter value is 0) D07A", the first server key D07 used when the counter value D02 is 1 is represented as a "first server key (when the counter value is 1) D07B" or the like, and the encrypted first derived key D08 which is encrypted is represented as an "encrypted first derived key (when the counter value is 0) D08A", an "encrypted first derived key (when the counter value is 1) D08B", or the like. As described above, the encrypted first derived key D08 is generated for each counter value D02, and in the exemplary embodiment, a total of four encrypted first derived keys D08 are generated. The first server key D07 may be a common key or may be a secret key/public key.

Next, an electronic signature (hereinafter referred to simply as signature) D12 to be attached to a client certification is generated. The signature D12 is generated by performing calculation using a predetermined signature generation algorithm that uses a signature key D09 that is a key for signatures. Specifically, the signature D12 is generated by performing a signature operation, using the signature key D09, on data that includes a total of seven data elements such as (A) a client ID_D10, (B) a second KDF seed-specifying first parameter described later (hereinafter sometimes referred to as first specification parameter) D11, and (C) the above four encrypted first derived keys D08.

Here, the client ID_D10 is an ID for identifying the client 3. For example, the ID of the SoC, the serial number, the manufacturing number, or the like of the client device may be used as the client ID_D10. When the client is implemented using emulator technology, this number may be information of the target to be emulated. When a certification is to be created, for example, the client ID_D10 may be read from the client 3 connected to the PC 4 and targeted for the process of writing the certification data. In addition, the first specification parameter D11 is used to specify the value of the second KDF seed data D04 in the server 1 (details thereof will be described later).

Figure 4:
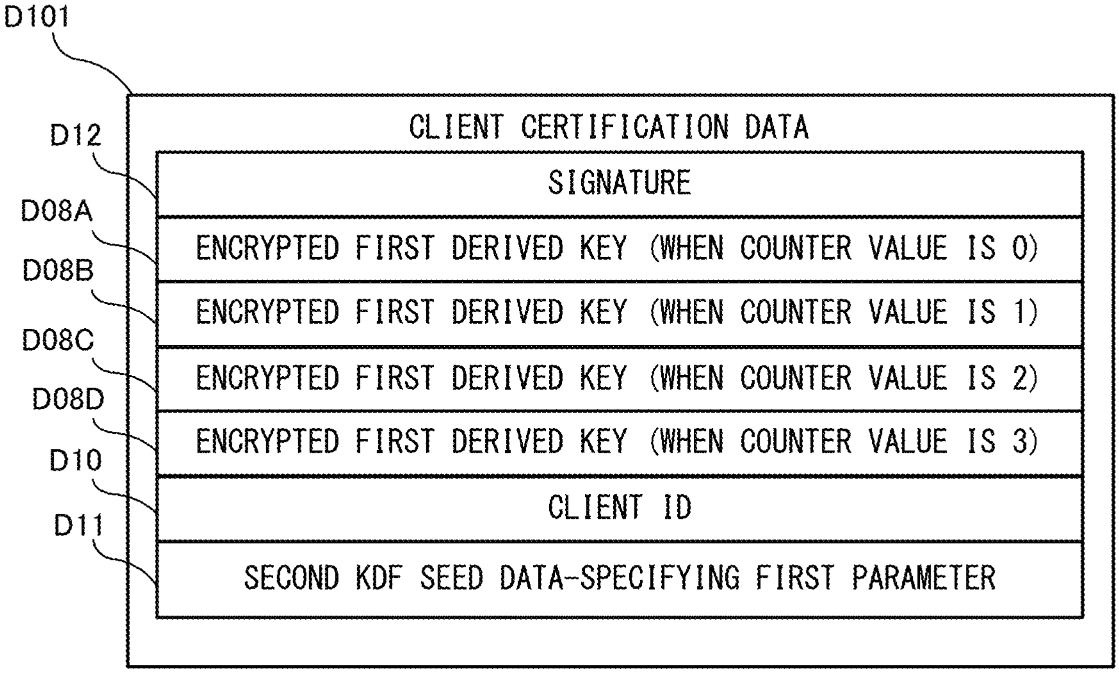
FIG. 4 shows a non-limiting example of the structure of certification data D101.

Next, the certification data D101 that includes the client ID_D10, the first specification parameter D11, and the above four encrypted first derived keys D08 and to which the signature D12 generated as described above is attached, is generated. FIG. 4 shows the structure of the certification data D101. The certification data D101 includes the signature D12, the four encrypted first derived keys D08A to D08D, the client ID_D10, and the above first specification parameter D11.

Finally, a process of writing the generated certification data D101 to the non-volatile storage unit (described later) of the client 3 is executed. As described later, the certification data D101 is transmitted from the client 3 to the server 1 in the course of the authentication process, and each data included in the certification data D101 is used in the server 1. Of the data included in the certification data D101, the encrypted first derived key D08 (strictly speaking, the first derived key D05 obtained by decrypting the encrypted first derived key D08) is first derived key data that is a result obtained by performing the first KDF calculation, and the server 1 sets the response key using this data. Therefore, it is not necessary to execute the first KDF calculation in the server 1. The certification data D101 may be downloaded, transferred, or the like from a predetermined server or another PC to the client 3 and written to the client 3.

In the exemplary embodiment, the counter value D02 is used as seed data for the KDF calculation for setting the response key. Accordingly, it is possible to change the response key according to the situation.

In the exemplary embodiment, it is possible to include a plurality of derived keys in a certification and select and use the derived keys, and change of the response key can be efficiently achieved.

[Outline of Generation and Transmission of Challenge]

Figure 5:
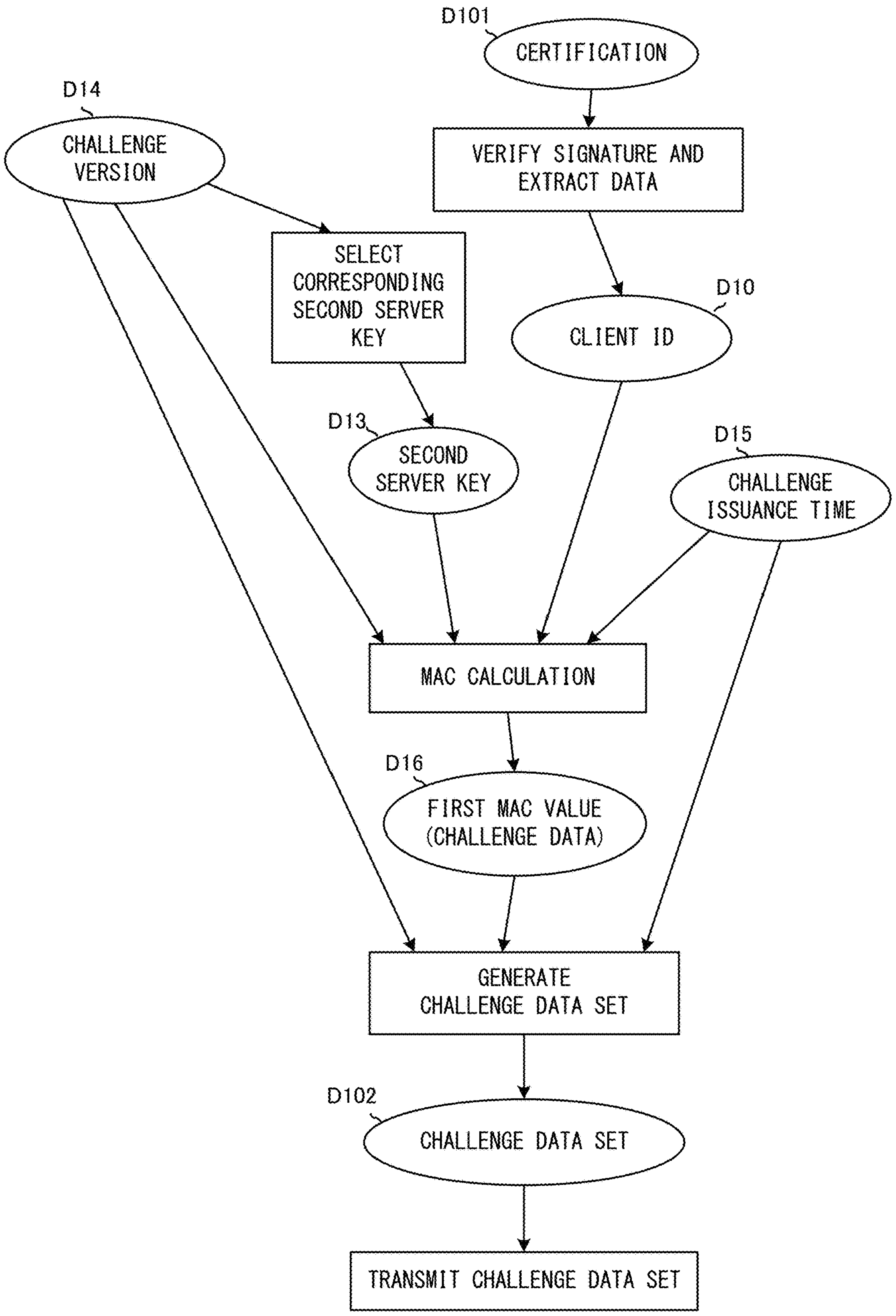
FIG. 5 is a diagram showing a non-limiting example of an outline of a process of generating and transmitting a challenge data set.

Next, an outline of a challenge data generation and transmission process in the server 1 will be described. This process is executed in response to a challenge issuance request from the client 3. The client 3 transmits the certification data D101 when making the challenge issuance request. FIG. 5 shows the outline of the challenge data generation and transmission process in the server 1 and is a diagram schematically showing the flow of data in this process. In this process, first, the certification data D101 is received from the client 3, and verification thereof (signature verification) is performed. If there are no problems as a result of the verification, the client ID_D10 is extracted from the certification data D101.

Next, predetermined MAC calculation using a "second server key" D13 with the client ID_D10, a "challenge version" D14, and a "challenge issuance time" D15 as calculation targets is performed, and a first MAC (Message Authentication Code) value D16 is calculated. The first MAC value D16 is used as the challenge data.

In the exemplary embodiment, the challenge data is generated by the MAC calculation, but the MAC calculation may be any cryptographic calculation by which falsification verification data (data used for falsification verification) can be generated, and, for example, the AES-GCM algorithm or the like may be used. In addition, the second server key used for this calculation may be a common key or may be a secret key/public key.

Here, the challenge version D14 is data stored in the server 1, is information that defines the "version" of the generation method for the challenge data generated in the server 1 at a certain time, and is information that indicates the current version. For example, the challenge version D14 is initially set to "1.0" and can be changed to "2.0" at a predetermined time.

The challenge issuance time D15 is a time of the server 1 at which a process of generating the challenge data is performed in the server 1.

The second server key D13 is key data used for calculating the first MAC value (challenge data) D16. In the exemplary embodiment, the second server key D13 can be different for each challenge version D14 (it is possible that the key does not change even if the version changes). In the exemplary embodiment, the second server key D13 corresponding to the current challenge version D14 is selected, and this is used for calculating the first MAC value (challenge data) D16. The first MAC value D16 is data to be calculated using the response key in the client 3 and is the so-called challenge data.

Figure 6:
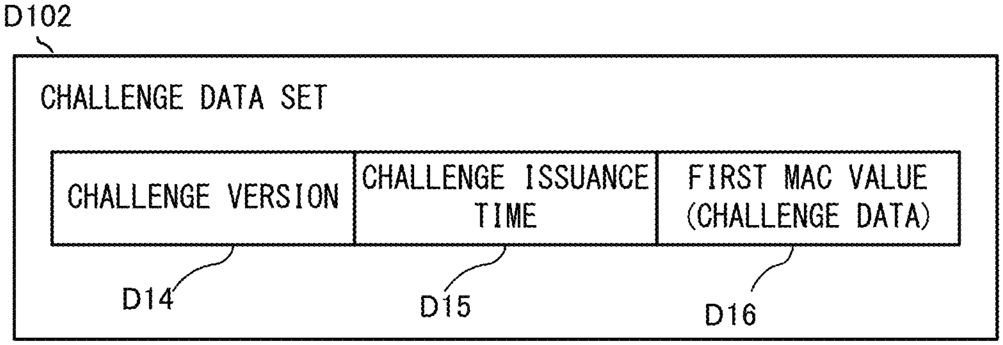
FIG. 6 shows a non-limiting example of the structure of a challenge data set D102.

After the first MAC value D16 is calculated, the challenge data set D102 is generated based on the (current) challenge version D14, the challenge issuance time D15, and the first MAC value (challenge data) D16. FIG. 6 schematically shows the structure of the challenge data set D102. The challenge data set D102 is data that includes the challenge data and also includes other data. In the exemplary embodiment, the challenge data set D102 is data that includes the following respective contents: "challenge version D14+ challenge issuance time D15+first MAC value (challenge data) D16". Generally, the value of the result of the MAC calculation is added to data (message data) to be calculated and is transmitted. However, in the exemplary embodiment, the client ID_D10 is used for calculating the first MAC value but is not included in the challenge data set.

The challenge data set D102 generated as described above is transmitted to the client 3 that has made the challenge transmission request.

[Outline of Response Generation Process in Client 3]

Figure 7:
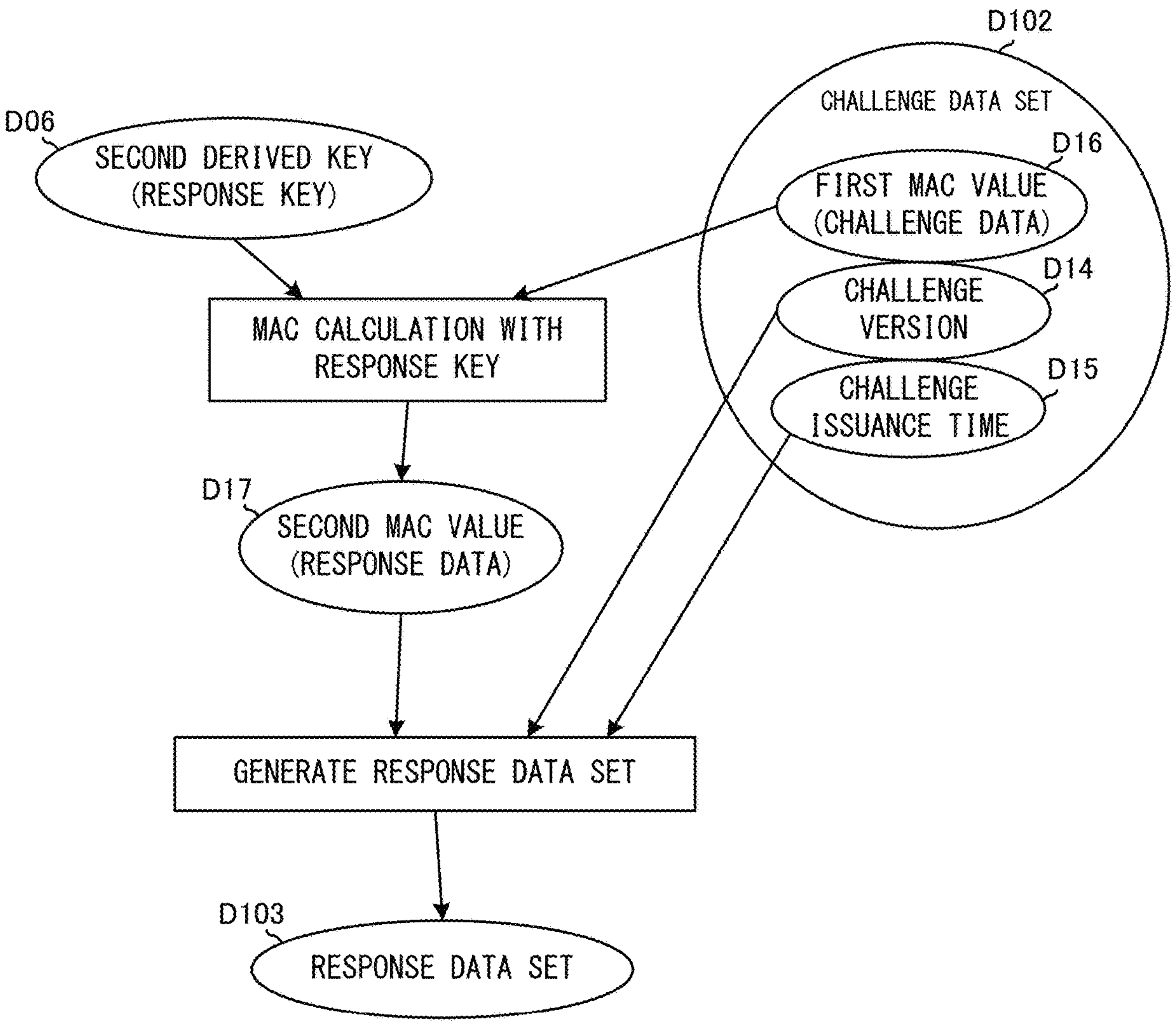
FIG. 7 is a diagram showing a non-limiting example of an outline of a response data set generation process.

Next, an outline of a response generation process executed in the client 3 that has received the challenge data set D102 will be described. FIG. 7 is a diagram for describing the outline of this process. First, a second MAC value (response data) D17 is calculated by performing MAC calculation on the first MAC value (challenge data) D16 included in the challenge data set D102 received from the server 1, using the response key (client) (second derived key (client) D06) set as described above using FIG. 2. The second MAC value D17 is a result obtained by calculation on the challenge data using the response key and is the so-called response data. The content of the MAC calculation when calculating the second MAC value (response data) D17 may be the same as or different from the content of the MAC calculation when calculating the first MAC value (challenge data) D16. The length of the first MAC value, which is the data to be inputted into the second MAC calculation, is determined by the content of the first MAC calculation and is a fixed length regardless of the length of the data to be inputted into the first MAC calculation.

In this example, the MAC calculation is used when generating the response data from the challenge data using the response key, but any algorithm by which the response data can be generated from the challenge data using the response key may be used, without limitation to the MAC calculation.

Next, the response data set D103 is generated based on this second MAC value (response data) D17, and the challenge version D14 and the challenge issuance time D15 which are included in the received challenge data set D102. The response data set D103 is data that includes the response data and also includes other data (in the exemplary embodiment, data other than the challenge data included in the challenge data set D102 received from the server 1. Specifically, the challenge version D14 and the challenge issuance time D15) As described above, generally, the value of the result of the MAC calculation is added to data (message data) to be calculated and is transmitted. However, in the exemplary embodiment, the first MAC value (challenge data) D16 is used for calculating the second MAC value (response data) D17 but is not included in data (a response data set or client transmission data described later) when the second MAC value (response data) D17 is transmitted to the server.

Figure 8:
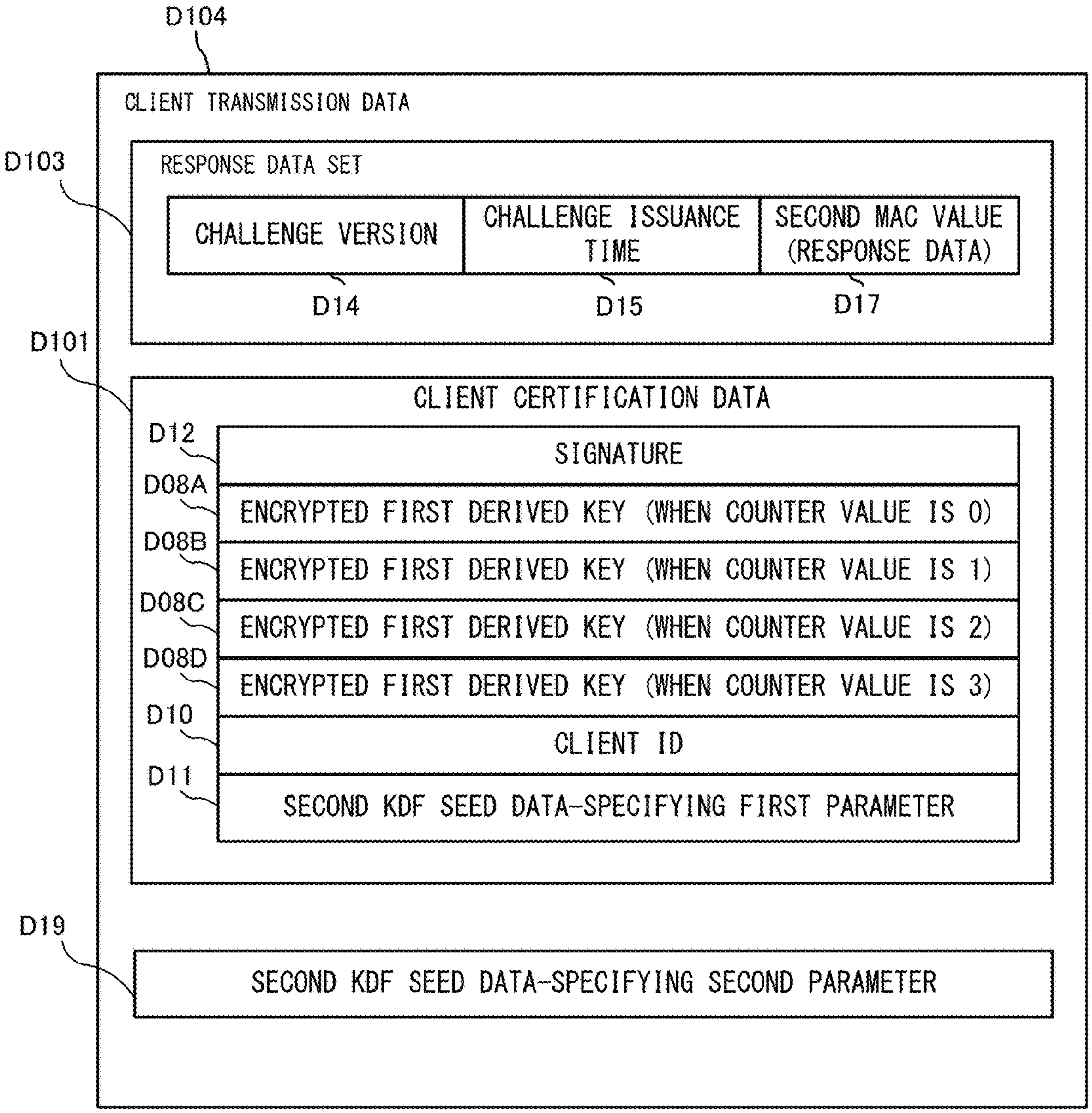
FIG. 8 shows a non-limiting example of data to be transmitted by a client 3 to a server 1.

After the response data set D103 is generated, the client 3 transmits (A) the response data set D103, (B) the certification data D101, and (C) a second KDF seed data-specifying second parameter (hereinafter sometimes referred to as second specification parameter) D19 described later, to the server 1. FIG. 8 is a schematic diagram of data to be transmitted by the client 3 to the server 1 (hereinafter sometimes collectively referred to as client transmission data D104). Each data of the client transmission data may be transmitted together or separately at different timings. In FIG. 8, the response data set D103 includes the challenge version D14, the challenge issuance time D15, and the second MAC value (response data) D17. The response data set D103 has a structure in which the first MAC value (challenge data) D16 of the above challenge data set D102 is replaced with the second MAC value (response data) D17. That is, the challenge version D14 and the challenge issuance time D15 included in the challenge data set received from the server 1 when the challenge data is received are included in the response data set and are transmitted to the server 1 when transmitting the response data. The certification data D101 is the same as the certification data D101 transmitted when making the challenge issuance request. That is, the certification data D101 is transmitted when requesting the server 1 to transmit the challenge data and when transmitting the response data to the server 1. The second specification parameter D19 is a parameter that is used for specifying the value of the second KDF seed data D04 in the processing of the server 1 together with the first specification parameter D11 (details thereof will be described later).

Next, an outline of a process related to response verification in the server 1 that has received the client transmission data D104 will be described. In the server 1, first, a response key (server) is set. Next, a second MAC value (for verification) D217 is calculated using the set response key (server). Then, verification of the response data D17 is performed by determining whether or not the second MAC value (for verification) D217 calculated in the server 1 matches the second MAC value (response data) D17 transmitted from the client.

Figure 9:
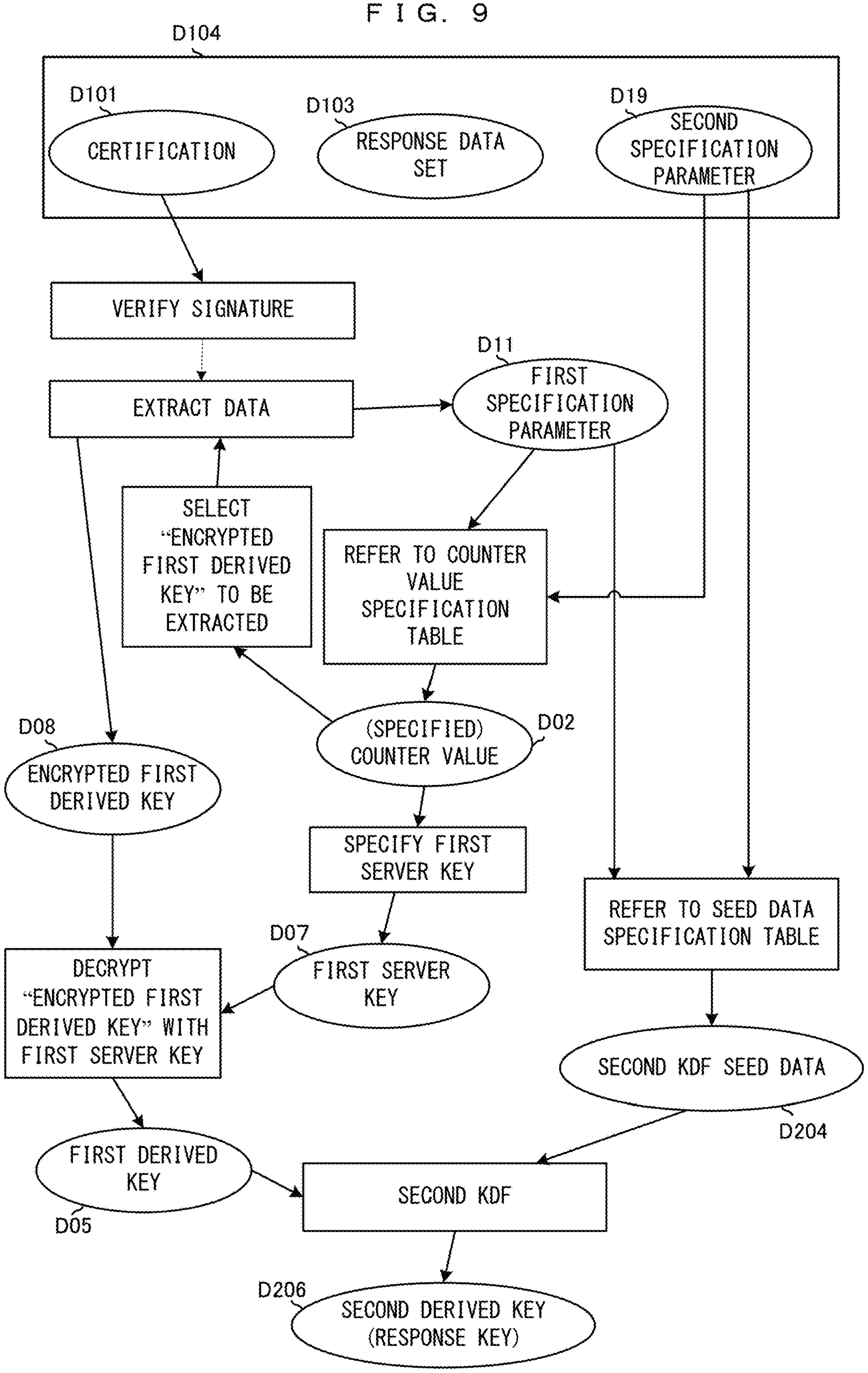
FIG. 9 is a diagram showing a non-limiting example of an outline of a response key setting process in the server 1.

FIG. 9 is a diagram for describing an outline of the response key setting process in the server 1. First, verification of the signature D12 is performed for the certification data D101 included in the client transmission data D104. If there are no problems with the verification, the encrypted first derived key D08 and the first specification parameter D11 are extracted from the certification data D101. Here, as described above, the certification data D101 includes the four encrypted first derived keys D08, and one of the four encrypted first derived keys D08 is specified and extracted in the following procedure. First, the current counter value D02 in the client 3 is specified. This specification is performed by referring to a "counter value specification table" stored in advance in the server 1. The counter value specification table is a table for, based on the first specification parameter D11 and the second specification parameter D19 transmitted from the client 3, specifying the current counter value D02 of this client. That is, the current counter value D02 in the client 3 that has transmitted the response data (client 3 to be authenticated) is specified using the first specification parameter D11 extracted from the certification data D101 and the second specification parameter D19 transmitted together with the certification data D101. FIG. 10 shows an example of the data structure of the counter value specification table SV404. In the counter value specification table SV404, the counter value D02 is defined in association with a combination of the value of the first specification parameter D11 and the value of the second specification parameter D19.

Referring back to FIG. 9, next, in the server 1, among the plurality of encrypted first derived keys D08 included in the certification data D101, the encrypted first derived key D08 corresponding to the counter value D02 specified using the counter value specification table SV404 is selected and extracted from the certification data D101. Next, in the server 1, the first derived key D05 is obtained by decrypting the extracted encrypted first derived key D08 using the first server key D07 stored in the server 1. Here, the first server key D07 is key data that differs depending on the counter value D02 as described above. Here, if the counter value D02 can be different depending on the client 3, each first server key D07 corresponding to the currently possible counter value D02 is stored in the server 1, and the first server key D07 corresponding to the specified counter value D02 is used.

Next, a process of the second KDF is executed using the decrypted first derived key D05 and second KDF seed data D204. Here, (the value of) the second KDF seed data D204 in the process of the second KDF is determined as follows. A "second KDF seed data specification table" is used for specifying the value of the second KDF seed data D204. The second KDF seed data specification table is a table for specifying the above second KDF seed data D04, based on the first specification parameter D11 and the second specification parameter D19. That is, the second KDF seed data D04 in the client 3 that has transmitted the response data is specified using the first specification parameter D11 extracted from the certification data D101 and the second specification parameter D19 transmitted from the above client together with the certification data D101. FIG. 11 shows an example of the data structure of a second KDF seed data specification table SV405. In the second KDF seed data specification table SV405, the value of the second KDF seed data D204 is defined in association with a combination of the first specification parameter D11 and the second specification parameter D19. That is, as described above using FIG. 2, in the response key setting process in the client 3, a response key is set using the second KDF seed data stored in the client 3. Meanwhile, in the response key setting process in the server 1, the value of the second KDF seed data D04 stored in the client 3 that has transmitted the response data is specified based on the first specification parameter D11 and the second specification parameter D19 received from the client 3, and a response key is set using this value. This is one of the differences between the response key setting process executed in the server and the response key setting process executed in the client.

In the exemplary embodiment, in the server 1, the KDF seed data is specified using the specification parameters transmitted from the client 3. With such a configuration, it is possible to set a response key in consideration of the attributes, the status, or the like of the client (client device to be emulated when implemented using emulator technology). In addition, in the exemplary embodiment, for specifying the KDF seed data, two parameters are used, the first specification parameter is targeted for a signature operation, and the second specification parameter is not targeted for a signature operation. This configuration allows the structure of the KDF seed data to be flexible, for example, by using a parameter for which a signature operation is possible and a parameter for which a signature operation is difficult.

What parameters are to be used as the first specification parameter D11 and the second specification parameter D19 may be designed as appropriate. For example, the first specification parameter D11 may be a fixed value. For example, the first specification parameter D11 may be attribute information of the hardware of the client 3. The second specification parameter D19 may be data that can be set or changed in the client 3. For example, the second specification parameter D19 may be attribute information of software or may be attribute information of system software (e.g., version information of system software). The first specification parameter D11 may be data that can be set or changed in the client 3, or the second specification parameter D19 may be a fixed value. When the client 3 is implemented using emulator technology, the first specification parameter and the second specification parameter may each be attribute information or the like of the target to be emulated. However, in this example, the first specification parameter and the second specification parameter are data different from the second KDF seed data, and are data that allow the second KDF seed data to be specified by a combination of the first specification parameter and the second specification parameter. In addition, in this example, the first specification parameter and the second specification parameter are also data different from the first KDF seed data.

Referring back to FIG. 9, in the server 1, a second derived key (server) D206 is generated by executing a calculation process of the second KDF using the second KDF seed data D204 determined as described above and the first derived key D05 extracted from the certification data D101. The calculation content (algorithm) of the second KDF performed in the server 1 is the same as the calculation content of the second KDF performed in the client 3. Then, in the server 1, the generated second derived key (server) D206 is used as the response key. That is, the response key (server) is set by generating the second derived key (server) D206.

Here, if the data on which the KDF calculation is based and the calculation content of the KDF calculation differ depending on the configuration of the client, it is necessary to manage a database or the like for changing the data on which the KDF calculation is based and the calculation content of the KDF calculation in accordance with the configuration of each client when generating the derived key in the server 1. However, in the exemplary embodiment, for the first KDF calculation, data (derived key) resulting from the KDF calculation is transmitted from the client 3 to the server 1, and the server 1 generates the response key using this data, so that it is not necessary to have such a database.

In the exemplary embodiment, the KDF calculation is performed in multiple stages, and as for the first KDF calculation, the calculated derived key is transmitted from the client 3 to the server 1, and in the server 1, another KDF calculation (second KDF calculation) is executed using the derived key to generate the response key. Accordingly, verification by a method corresponding to the nature of verification elements is made possible by calculating in advance some of a plurality of aspects, which are the verification elements, and calculating the other aspects in the server.

As shown in FIG. 9, in the response key setting process in the server 1, the response data set D103 is not used. In a verification process described below, verification of the second MAC value (response data) D17 included in the response data set D103 is performed.

[Outline of Verification Process]

Figure 12:
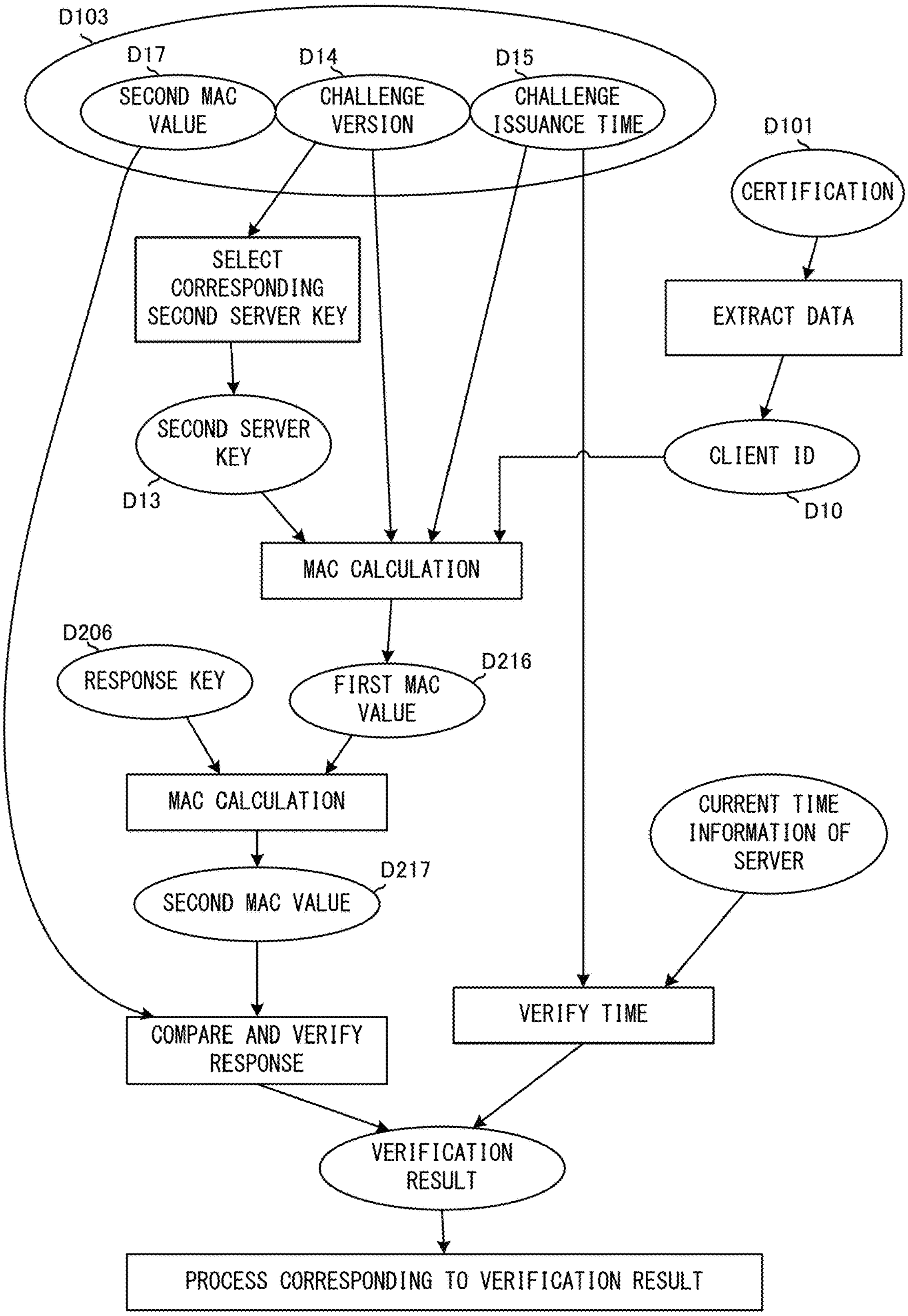
FIG. 12 is a diagram showing a non-limiting example of an outline of a verification process.

Next, an outline of the verification process performed in the server (in this example, including not only verification of the response data but also verification of the challenge issuance time included in the response data, as described later) will be described. FIG. 12 is a diagram for describing the outline of the verification process. In the verification process, a process of verifying the second MAC value D17, which is the response data, is performed by calculating the second MAC value (for verification) D217 on the server 1 side and determining whether or not the second MAC value (for verification) D217 matches the second MAC value (response data) D17 transmitted from the client 3.

First, a process of calculating a first MAC value (for verification) D216 is performed in the server 1. This process is basically the same as the process of calculating the first MAC value (challenge data) D16 in the challenge generation process described above using FIG. 5. Based on the challenge version D14 included in the response data set D103 transmitted from the client 3, the second server key D13 corresponding to the challenge version D14 is selected. Then, the first MAC value (for verification) D216 is calculated by calculating a MAC value with the "challenge version D14 and the challenge issuance time D15 included in the response data set D103 and the client ID_D10 included in the certification data D101 transmitted from the client (certification data D101 transmitted when the verification request was made)" as targets using the selected second server key D13.

As for a process of calculating a first MAC value (for verification) D16, in another exemplary embodiment, the first MAC value (challenge data) D16 calculated in the above challenge generation process may be stored in the server 1. Then, the stored first MAC value (challenge data) D16 may be used in the verification process, and the process of calculating the first MAC value (for verification) D16 may be omitted.

Next, the second MAC value (for verification) D217 is calculated by the same algorithm as for the MAC calculation in the client 3, using the response key (server) D206 set above and the first MAC value (for verification) D216.

Next, the second MAC value (response data) D17 included in the response data set D103 and the second MAC value (for verification) D217 calculated above are compared, and it is determined whether or not the second MAC value (response data) D17 and the second MAC value (for verification) D217 match. If the second MAC value (response data) D17 and the second MAC value (for verification) D217 match, the result of the response verification is determined to be OK (positive), and if the second MAC value (response data) D17 and the second MAC value (for verification) D217 do not match, the result of the response verification is determined to be NG (negative).

Furthermore, in the exemplary embodiment, in the server 1, a verification process is performed from a temporal perspective. In this process, it is determined whether or not the time from when the server 1 issues the challenge data set D102 to when the client returns the response data set D103, etc. (or the time from when the challenge data is issued to when verification is executed) is within a certain time. Specifically, the challenge issuance time D15 included in the above response data set D103 is compared with the current time of the server 1 at the time of executing the verification process. If this time is within the certain time, it is determined to be OK, and if this time is equal to or longer than the certain time, it is determined to be NG.

Then, if both the verification of the response data D17 and the verification from a temporal perspective are OK, it is determined that the authentication has been successful. In all other cases, it is determined that the authentication has failed. If the authentication has been successful, a process of transmitting a predetermined service token to the client is executed. If the authentication has failed, an error message or the like is transmitted. The content of the service token is, for example, information including the client ID, the identifier of the predetermined online service, an expiration date, and the signature or MAC value of these data.

As described above, in this example, when issuing the challenge, at least a MAC value (first MAC value) for which the challenge issuance time is used as a target in MAC calculation is transmitted from the server 1 to the client 3 together with the challenge issuance time. In addition, when generating the response data, the client 3 generates a value (second MAC value) obtained by further performing MAC calculation on the MAC value using the response key, as the response data, and transmits this value to the server 1. The server 1 uses this as the verification target and also performs temporal verification using the challenge issuance time. Accordingly, fraud in the course of the authentication process can be prevented.

Hereinafter, the details of processing according to the exemplary embodiment will be described.

[Hardware Configuration of Client 3]

Figure 13:
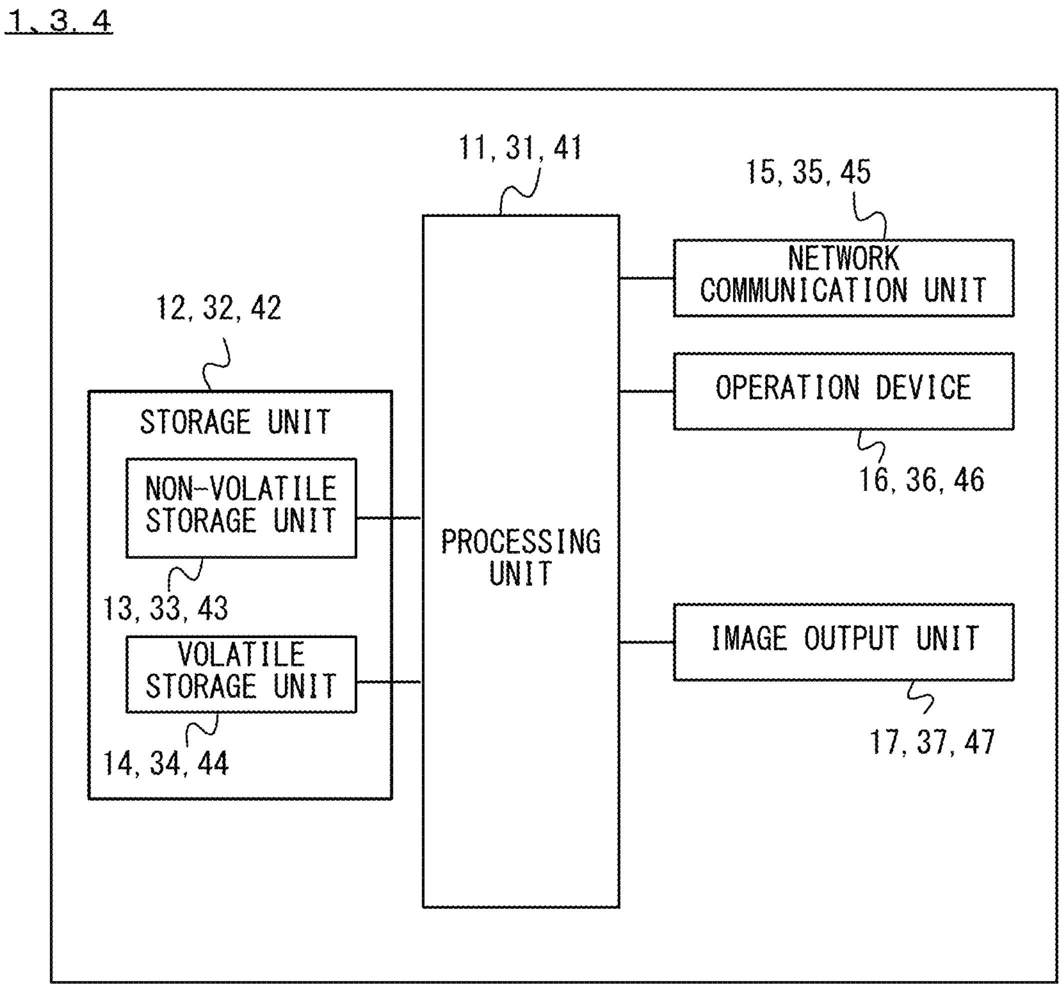
FIG. 13 is a block diagram showing a non-limiting example the hardware configuration of the client 3.

Next, the hardware configuration of the above client 3 will be described. FIG. 13 is a block diagram showing the hardware configuration of the client 3. In the exemplary embodiment, the client 3 is a game apparatus but may be a general-purpose PC, a smartphone, a tablet device, or the like. The client 3 is an example of a computer and includes a processor, a memory, peripheral processors such as a communication processor and a display processor, etc. The client 3 includes at least a processing unit 31, a storage unit 32, a network communication unit 35, an operation device 36 (game controller), and an image output unit 37. The processing unit 31 is, for example, a processor and executes various programs for controlling the client 3. The client 3 may be composed of a plurality of devices. The processing unit 31 may be composed of a plurality of processors. In this case, the processing unit 31 may be composed of a plurality of processors of a plurality of devices. In addition, these processors may each be a general-purpose processor or a dedicated processor, and may each be any type, such as a SoC, CPU, ASIC, or microcomputer. In the storage unit 32, the various programs executed by the processing unit 31 and various data used by the processing unit 31 are stored. The programs may each be a program group composed of a plurality of programs, each of which may be executed by a different processor, and each of which may be stored in a different memory. In addition, the programs may each be in any form of software, such as application software, system software, firmware, and emulators. The programs may each include data and table parameters in addition to code. Specifically, the storage unit 32 includes a non-volatile storage unit 33 and a volatile storage unit 34. The non-volatile storage unit 33 is, for example, a flash memory, an SSD (Solid State Drive), or the like. The volatile storage unit 34 is, for example, a DRAM and functions as a main memory. Various programs and data stored in the non-volatile storage unit 33 are read on the volatile storage unit 34 if necessary, and various processes described later can be executed by the processing unit 31. The network communication unit 35 communicates with another server or client 3 via a network such as the Internet (wirelessly or via a wire). The network communication unit 35 may be configured to communicate directly with a communication partner, not via a network. The network communication unit 35 may be a communication processor. The operation device 36 is various operation devices (keyboard, mouse, etc.). The image output unit 37 outputs a predetermined image generated as a result of information processing by the processing unit 31.

As for each of the non-volatile storage unit 33 and the volatile storage unit 34, a partial region thereof may be configured as a secure region. Some of various data described later may be stored in the secure region of a memory or the like in the SoC (System on a Chip), for example.

The hardware configurations of the server 1 and the PC 4 may be the hardware configurations of a general server and PC, and the hardware configurations are the same as in FIG. 13, although the description thereof is omitted. The server 1 may be composed of a plurality of server devices. That is, the server 1 is composed of a processing unit 11, a storage unit 12 including a non-volatile storage unit 13 such as a flash memory and a volatile storage unit 14 such as a DRAM, etc. The server 1 is an example of a computer. In addition, the PC 4 is composed of a processing unit 41, a storage unit 42 including a non-volatile storage unit 43 such as a flash memory and a volatile storage unit 44 such as a DRAM, etc.

Next, various data to be used in the processing according to the exemplary embodiment will be described.

[Data Used in Client 3]

Figure 14:
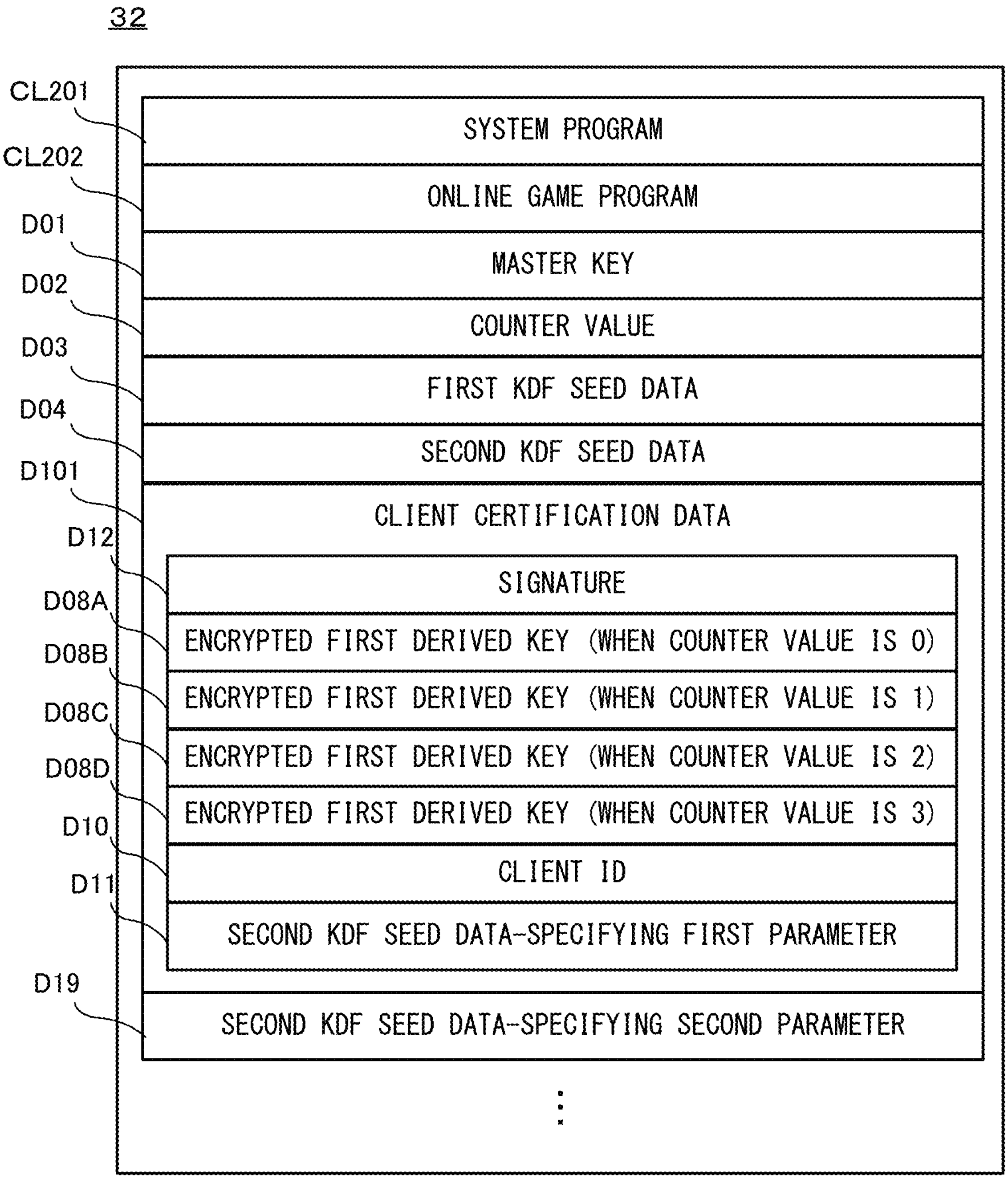
FIG. 14 shows a non-limiting example of data stored in a storage unit 32 of the client 3.

FIG. 14 shows an example of data stored in the storage unit 32 of the client 3. The data shown in FIG. 14 is data stored in the non-volatile storage unit 33, and when executing the authentication process, these data are read into the volatile storage unit 34 if necessary, whereby the authentication process can be executed. These data may be separated and stored in different memories. For example, some of these data may be stored in the above described secure region.

In FIG. 14, in the non-volatile storage unit 33, at least a system program CL201, an online game program CL202, the master key D01, the counter value D02, the first KDF seed data D03, the second KDF seed data D04, the certification data D101, and the second KDF seed data-specifying second parameter D19 are stored. In FIG. 14, each data other than the system program CL201 and the online game program CL202 is the same as the various data described above in terms of content.

Figure 15:
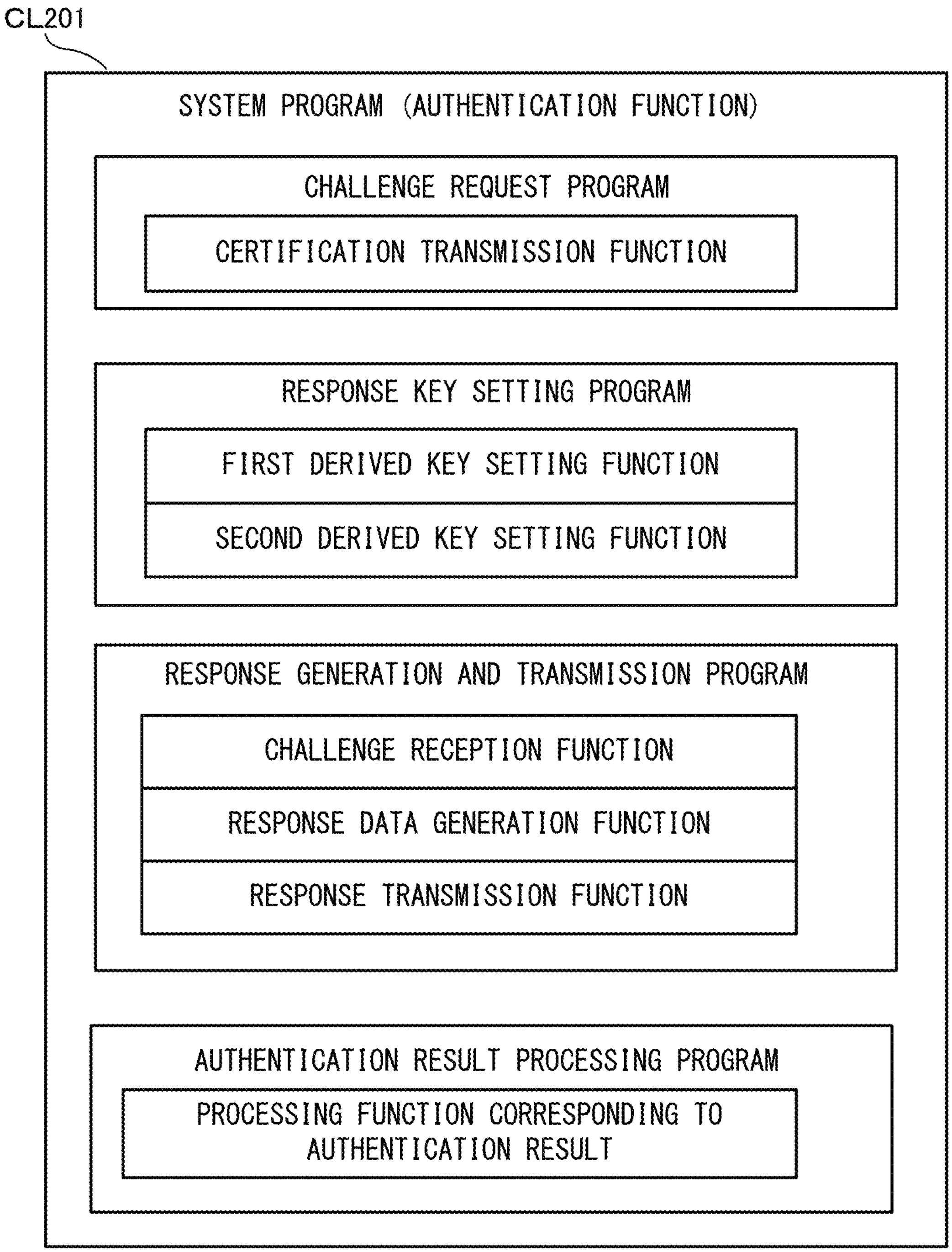
FIG. 15 is a diagram for describing a non-limiting example of the functional configuration of a system program CL201.

In FIG. 14, the system program CL201 is a program for controlling the system of the client 3. The system program CL201 includes at least a program for implementing the authentication function of the exemplary embodiment as shown in FIG. 15. First, the system program CL201 includes a challenge issuance request program for requesting the server 1 to issue a challenge. The system program CL201 also includes a response key setting program having a function for setting a response key (client). The system program CL201 also includes a response generation and transmission program having a function of receiving the challenge data set D102, generating the response data set D103, and transmitting the response data set D103, etc. (client transmission data described above). The system program CL201 also includes an authentication result processing program having a function of starting an online game, based on an authentication result. The device authentication process according to the exemplary embodiment is executed as one process on the system side that controls the client 3 (not as an application process).

Referring back to FIG. 14, the online game program CL202 is a program for a predetermined online game. In the exemplary embodiment, as described above, the device authentication process is executed when starting playing the online game.

The various data described above (including various data required for setting the response key (client) (seed data for each KDF calculation, certification data, parameters for specifying seed data, etc.)) may be downloaded at a predetermined timing or transferred from another information processing apparatus and stored in the storage unit 32. In this case, for example, the response key setting program may have a function of designating various data that have been downloaded or transferred. Alternatively, the response key setting program may have a function of designating the location where the various data are stored (a folder or the like in the client 3).

In another exemplary embodiment, for example, the data of the first derived key D05 may be stored in the storage unit 32. In this case, the master key D01 and the first KDF seed data D03 do not have to be stored in the storage unit 32.

In another exemplary embodiment, for example, the data of the second derived key D06 may be stored in the storage unit 32. In this case, the master key D01, the first KDF seed data D03, and the second KDF seed data D04 do not have to be stored therein. In this case, the response key setting program may be configured not to have a first derived key setting function.

[Data Used in Server 1]

Figure 16:
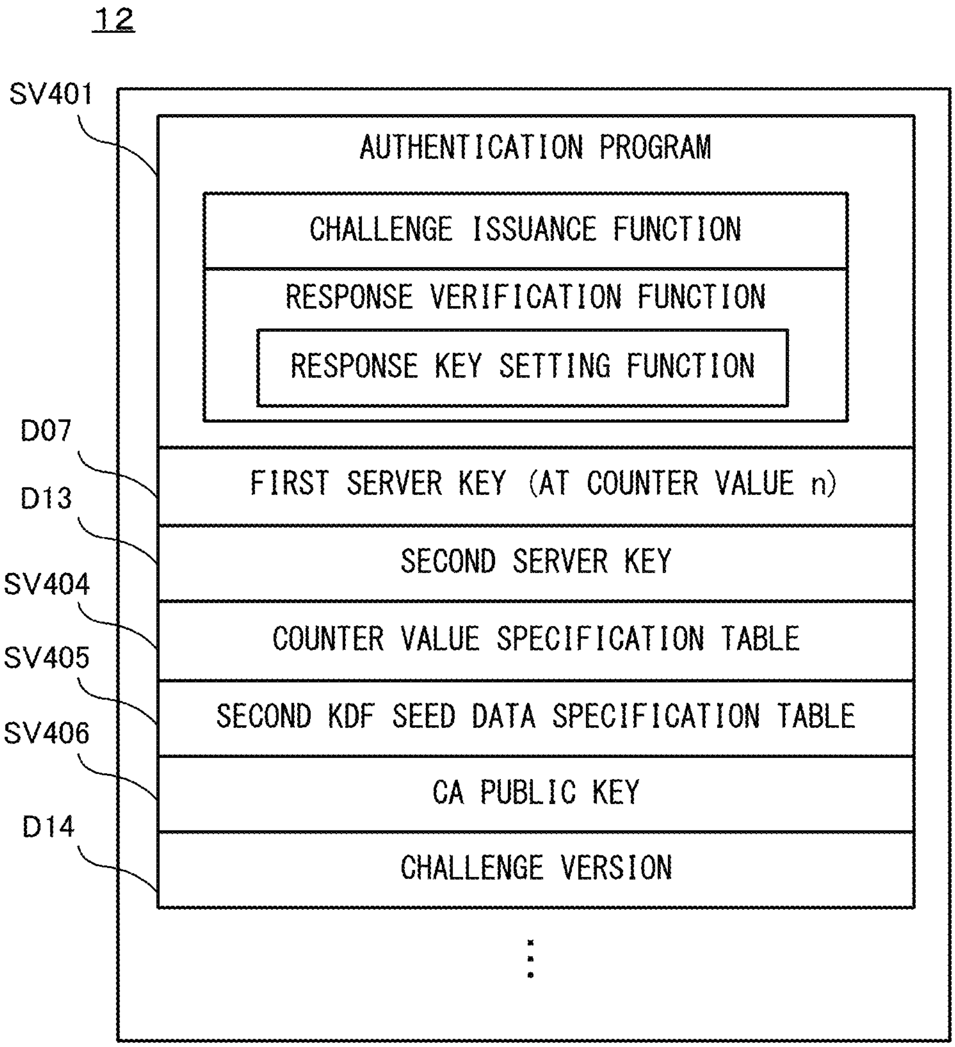
FIG. 16 shows a non-limiting example of data stored in a storage unit 12 of the server 1.

Next, data stored in the storage unit 12 of the server 1 will be described. FIG. 16 shows data stored in the non-volatile storage unit 13 of the server 1. When executing the authentication process, these data are read into the volatile storage unit 14 as appropriate if necessary, whereby the authentication process on the server 1 side can be executed.

In the non-volatile storage unit 13 of the server 1, an authentication program SV401, the first server key D07, the second server key D13, the counter value specification table SV404, the second KDF seed data specification table SV405, a CA public key SV406, the challenge version D14, etc., are stored.

The authentication program SV401 is a program for executing the authentication process on the server 1 side. The authentication program SV401 is a program that has a challenge issuance function of issuing the above challenge data and transmitting other data to the client 3 and a verification function of performing verification using the response data set D103 from the client 3, etc. In addition, the verification function also includes a function of setting the response key (server) described above using FIG. 12.

Here, supplementary description will be given regarding the first server key D07. As described above, in the exemplary embodiment, a plurality of key data each corresponding to the counter value are prepared for the first server key D07, but only one of these key data is stored as the first server key D07 stored in the server 1. Then, each time the counter value is incremented, the first server key D07 is stored so as to be placed with the key data corresponding to each counter value.

In the case where the counter value D02 of the client 3 is incremented when the system of the client 3 is updated, the timing of updating the counter value D02 in each client 3 is not necessarily the same. Therefore, during a certain period from the increment of the counter value D02 (for example, the timing of updating the system), the first server key D07 corresponding to the counter value D02 before the increment may be stored as an "old first server key". During the certain period, even if an authentication is requested from a client 3 whose system has not been updated, it may be determined that the authentication has been successful, using the "old first server key".

As described above, in the exemplary embodiment, the second server key D13 is key data having a content different for each challenge version D14. In the storage unit 12 of the server 1, key data having a content corresponding to the currently used challenge version D14 is stored as the second server key D13. When the challenge version D14 is changed, there is a possibility that there is a client 3 that makes a verification request using a challenge issued with an old challenge version, so that the second server key D13 corresponding to the old challenge version may be stored in advance, and a verification request from such a client 3 may be responded to.

The counter value specification table SV404 is data as shown in FIG. 10 above. Therefore, the detailed description thereof is omitted here.

The second KDF seed data specification table SV405 is data as shown in FIG. 11 above. Therefore, the detailed description thereof is omitted here.

The CA public key SV406 is key data that is paired with the signature key D09, and is key data (decryption key or verification key in public key cryptosystem) used for verifying the signature D12 of the certification data D101 in the server 1.

The challenge version D14 is a challenge version attached to a challenge issued at that time. As described above, in the exemplary embodiment, the second server key D13 is different for each challenge version, and thus, when the challenge data D16 is generated, the challenge version D14 is used for grasping which second server key D13 was used to calculate the first MAC value (challenge data) D16. Depending on the challenge version, various processes in the server 1 and/or the client 3 other than changing the second server key D13 may be changed. In this case, the processes may be branched according to the challenge version D14 included in the challenge.

[Data Used in Factory PC]

Figure 17:
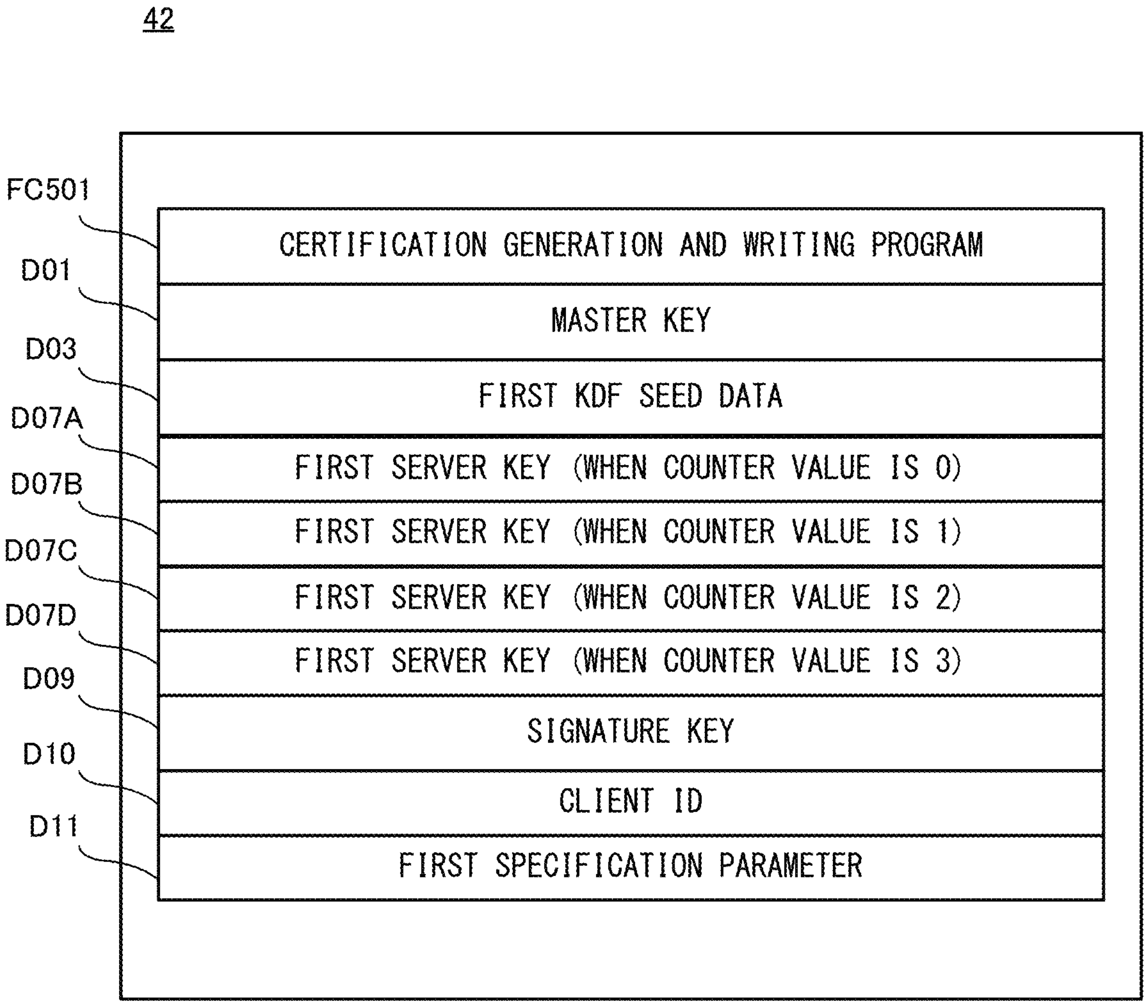
FIG. 17 shows a non-limiting example of data stored in a storage unit 42 of a PC 4.

Next, FIG. 17 shows an example of data stored in the storage unit 42 of the factory PC 4 described above. That is, FIG. 17 shows an example of data used in the certification creation process described above using FIG. 3. In the storage unit 42 of the PC 4, a certification generation and writing program FC501, the master key D01 (master key D01 corresponding to the client 3 to be manufactured), the first KDF seed data D03 (first KDF seed data D03 corresponding to the client 3 to be manufactured), four first server keys D07A to D07D, the signature key D09, the client ID_D10 (client ID_D10 corresponding to the client 3 to be manufactured), and the first specification parameter D11 (second KDF seed data-specifying first parameter D11 corresponding to the client 3 to be manufactured) are stored.

The certification generation and writing program FC501 is a program for generating the certification data D101 described above using FIG. 3 and writing the certification data D101 to the non-volatile storage unit 33 of the client 3.

For the second KDF seed data-specifying first parameter D11 used in the PC 4, for example, a predetermined value corresponding to the client 3 that is the writing target is set in advance.

Hereinafter, the details of processes performed in each of the PC 4, the client 3, and the server 1 will be described using flowcharts. The flowcharts described below are merely an example of the processing. Therefore, the order of each process step may be changed as long as the same result is obtained. In addition, the values of variables and thresholds used in determination steps are also merely examples, and other values may be used as necessary.

Figure 18:
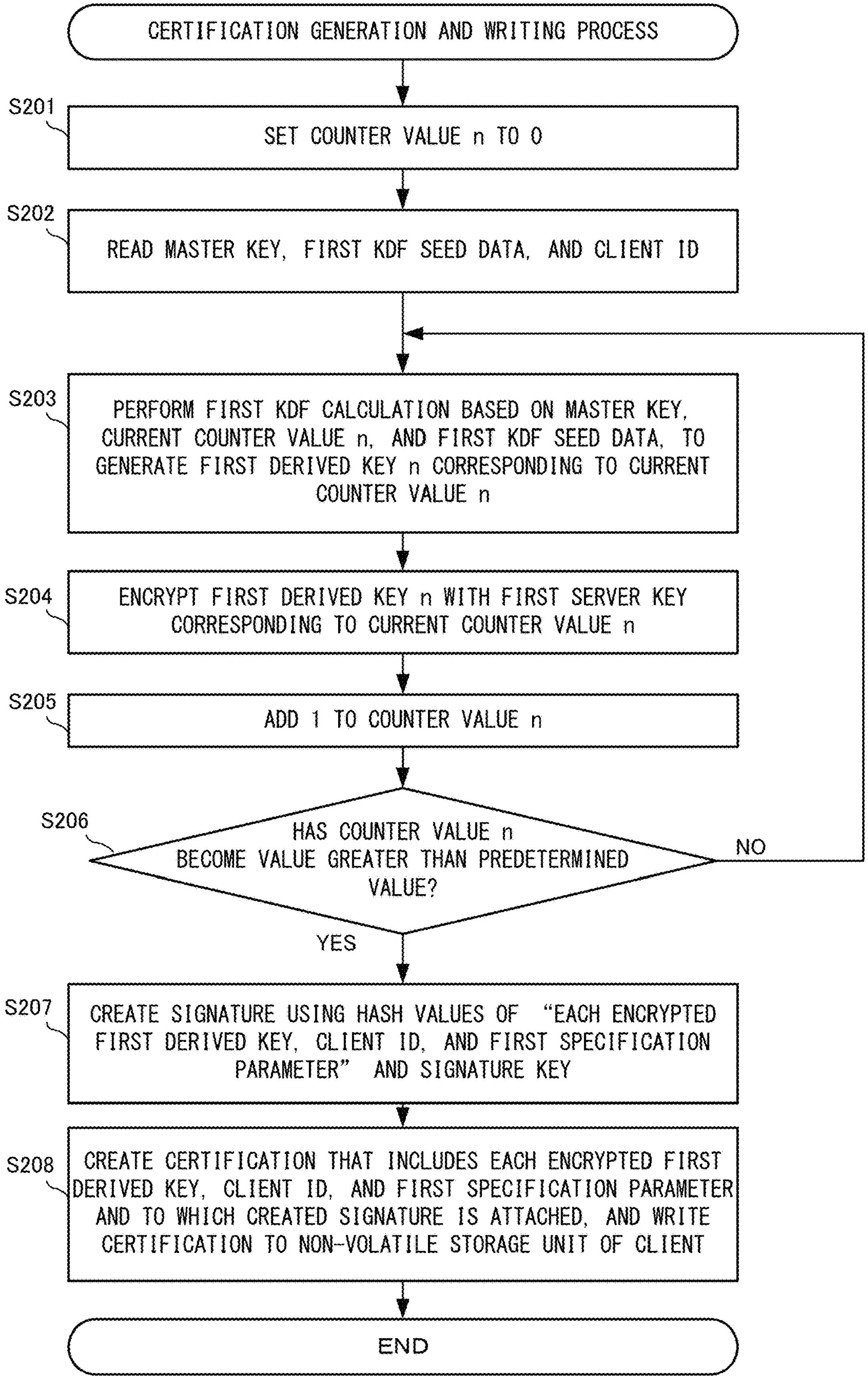
FIG. 18 is a non-limiting example of a flowchart of a certification generation and writing process.

First, the details of a certification generation and writing process executed in the above PC 4 will be described. FIG. 18 is an example of a flowchart of the certification generation and writing process. First, the processing unit 41 of the PC 4 sets a counter value n, which is a variable, to 0 (step S201).

Next, the processing unit 41 reads the master key D01, the first KDF seed data D03, and the client ID_D10 from the client 3 to which the certification data D101 is to be written, and stores the master key D01, the first KDF seed data D03, and the client ID_D10 in the storage unit 42 (step S202). For example, these data are read from the client 3 connected to the PC 4 and targeted for the writing process. These data may be generated on the manufacturing facility side or read from a storage device on the manufacturing facility side, rather than being read from the client 3.

Next, the processing unit 41 performs first KDF calculation, based on the master key D01, the current counter value n, and the first KDF seed data D03, to generate a first derived key n corresponding to the current counter value n (step S203).

Next, the processing unit 41 encrypts the generated first derived key n with the first server key D07 (key at the counter value n) corresponding to the current counter value n (step S204).

Next, the processing unit 41 adds 1 to the counter value n (step S205).

Next, the processing unit 41 determines whether or not the counter value n has become a value greater than a predetermined value (step S206). In the exemplary embodiment, the case where the counter value n can be a value from 0 to 3 has been shown, and thus the predetermined value is 3. If, as a result of this determination, the counter value n has not become a value greater than the predetermined value (NO in step S206), the processing unit 41 returns to step S203 above and repeats the processing.

On the other hand, if the counter value n has become a value greater than the predetermined value (YES in step S206), the processing unit 41 creates the signature D12 using the hash values of "the four encrypted first derived keys D08, the client ID_D10, and the first specification parameter D11" and a signature key FC-D09 (step S207).

Next, the processing unit 41 creates the certification data D101 (see FIG. 4) that includes the four encrypted first derived keys D08, the client ID_D10, and the first specification parameter D11 and to which the signature D12 created above is attached. Furthermore, the processing unit 41 writes the certification data D101 to the non-volatile storage unit 33 of the client 3 (step S208). The client 3 (e.g., game apparatus) to which such certification data D101 has been written is then shipped as a product. The certification data D101 may be downloaded, transferred, or the like from a predetermined server or another PC and written to the non-volatile storage unit 33 of the client 3.

Next, the details of the authentication process will be described. In the exemplary embodiment, the authentication process is composed of a challenge issuance session and a verification session. The challenge issuance session is a session that is started when a challenge issuance request is made by the client 3 and that is mainly for issuing the challenge data D16 in the server 1 and transmitting the challenge data D16 to the client 3 (as described later, other processes are also performed). The verification session is a session that is started when a verification request (for requesting response verification) is made by the client 3 and that is mainly for transmitting a response from the client 3, performing verification of the response in the server 1, and transmitting the result of the verification to the client 3. In the exemplary embodiment, the challenge issuance session and the verification session are separate communication sessions. In the case where the server 1 is composed of a plurality of server devices, the challenge issuance session and the verification session may be executed in separate server devices. The challenge issuance session and the verification session are different communication sessions, and these communication sessions are not a series of processes. Therefore, the issued challenge cannot be used as is when verifying the response. In the exemplary embodiment, data on which the challenge is based is transmitted to the client together with the challenge, the data (data on which the challenge is based) is returned from the client to the server together with the response, and the server generates a challenge again from the data, whereby the relationship between the issued challenge and the response is secured. The processes executed by the processing unit 11 of the server 1 and the processing unit 31 of the client 3 will be described using FIG. 19 to FIG. 30. The order of the processes described in FIG. 19 to FIG. 30 is merely an example and may be changed as appropriate. In addition, a plurality of processes may be performed in parallel.

[Details of Processes in Challenge Issuance Session]

Figure 19:
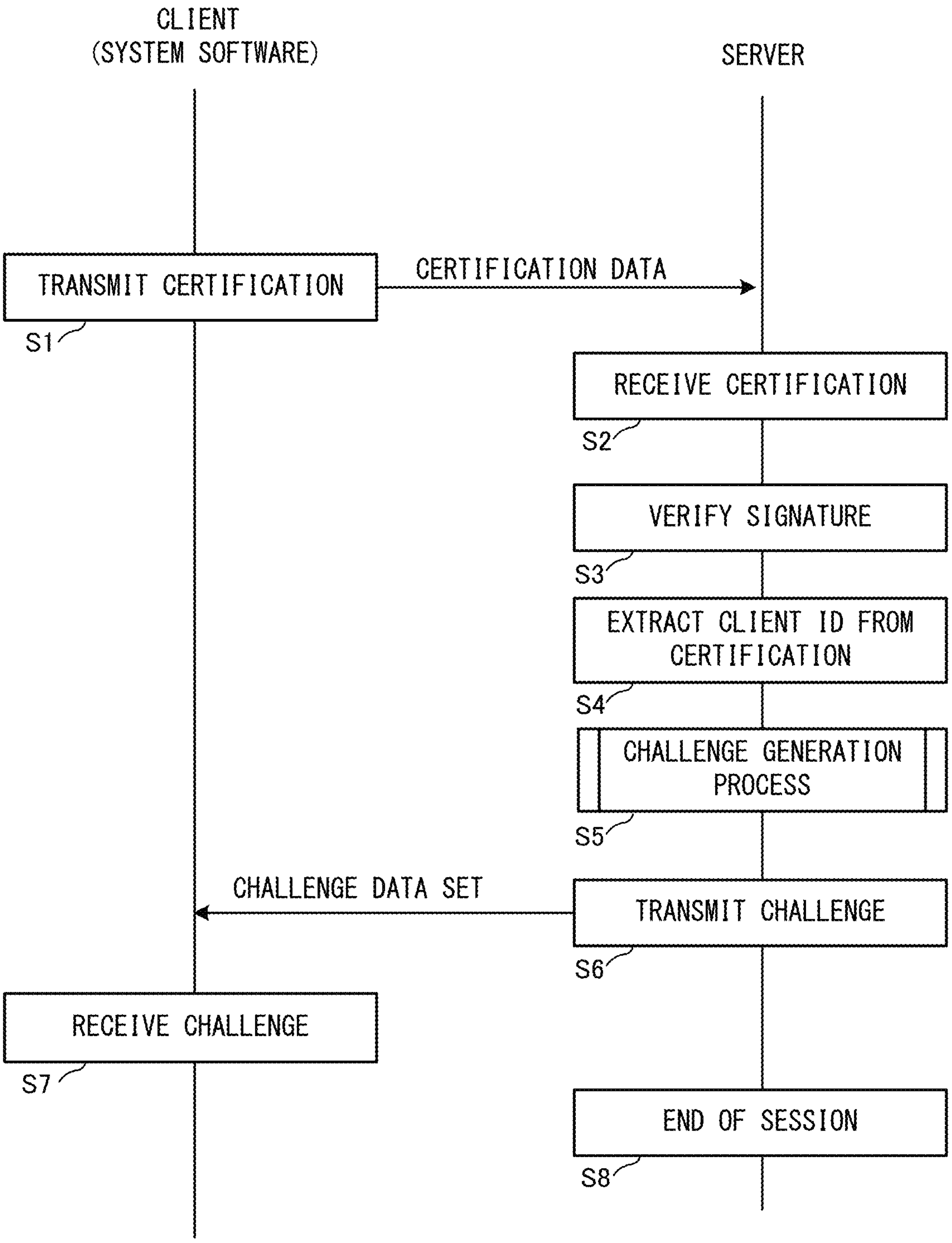
FIG. 19 is a diagram showing a non-limiting example of the details of processes in a challenge issuance session.

FIG. 19 is a diagram showing the details of processes in the challenge issuance session. FIG. 19 shows processes of the processing unit 31 of the client 3, which executes the system program (authentication function) CL201, and processes of the processing unit 11 of the server 1, which executes the authentication program SV401. In FIG. 19, first, the processing unit 31 of the client 3 establishes a session with the server 1 and performs a process of transmitting a request for challenge issuance and the certification data D101 via the network communication unit 35 (step S1).

Next, the processing unit 11 of the server 1 performs a process of receiving the certification data D101 via a network communication unit 15 (step S2).

Next, the processing unit 11 performs verification of the signature D12 (step S3). Specifically, the processing unit 11 decrypts the signature D12 using the above CA public key SV406. Then, using the result of the decryption, the processing unit 11 determines whether the above four encrypted first derived keys D08, the client ID_D10, and the first specification parameter D11 included in the certification data D101 have been falsified, and if the result of the decryption is a match, the result of the verification is determined to be positive. If the result of the decryption is not a match, the result of the verification is determined to be negative, the challenge data set D102 is not transmitted, the result of the verification is notified to the client 3 (or the communication may be terminated without notification), and the process ends.

If the result of the verification is positive, the processing unit 11 extracts the client ID_D10 from the certification data D101 (step S4). Next, the processing unit 11 executes a challenge generation process (step S5).

Figure 20:
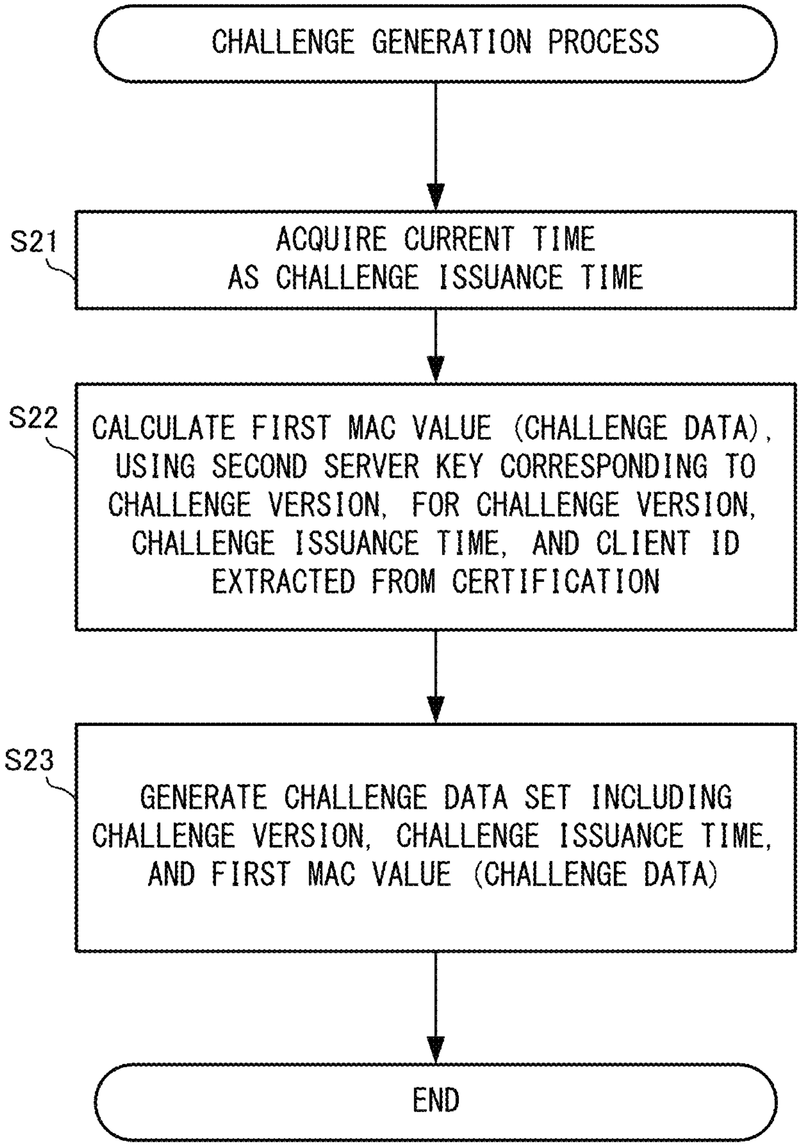
FIG. 20 is a non-limiting example flowchart showing the details of a challenge generation process.

FIG. 20 is a flowchart showing the details of the challenge generation process (step S5). First, the processing unit 11 acquires the current time of the server 1 as the challenge issuance time D15 (step S21).

Next, the processing unit 11 calculates the first MAC value (challenge data) D16, with the challenge version D14 read from the storage unit 12, the challenge issuance time D15 acquired in step S21, and the client ID_D10 acquired in step S4 as targets, using the second server key D13 corresponding to the challenge version D14 (step S22).

Next, the processing unit 11 generates the challenge data set D102 that includes the challenge version D14, the challenge issuance time D15, and the first MAC value (challenge data) D16 calculated in step S22 (step S23). Then, the challenge generation process ends.

Referring back to FIG. 19, after the challenge data set D102 is generated, the processing unit 11 performs a process of transmitting the challenge data set D102 to the client 3 via the network communication unit 15 (step S6).

Next, the processing unit 31 of the client 3 performs a process of receiving the challenge data set D102 via the network communication unit 35 (step S7). Then, the challenge issuance session is ended (step S8).

Figure 21:
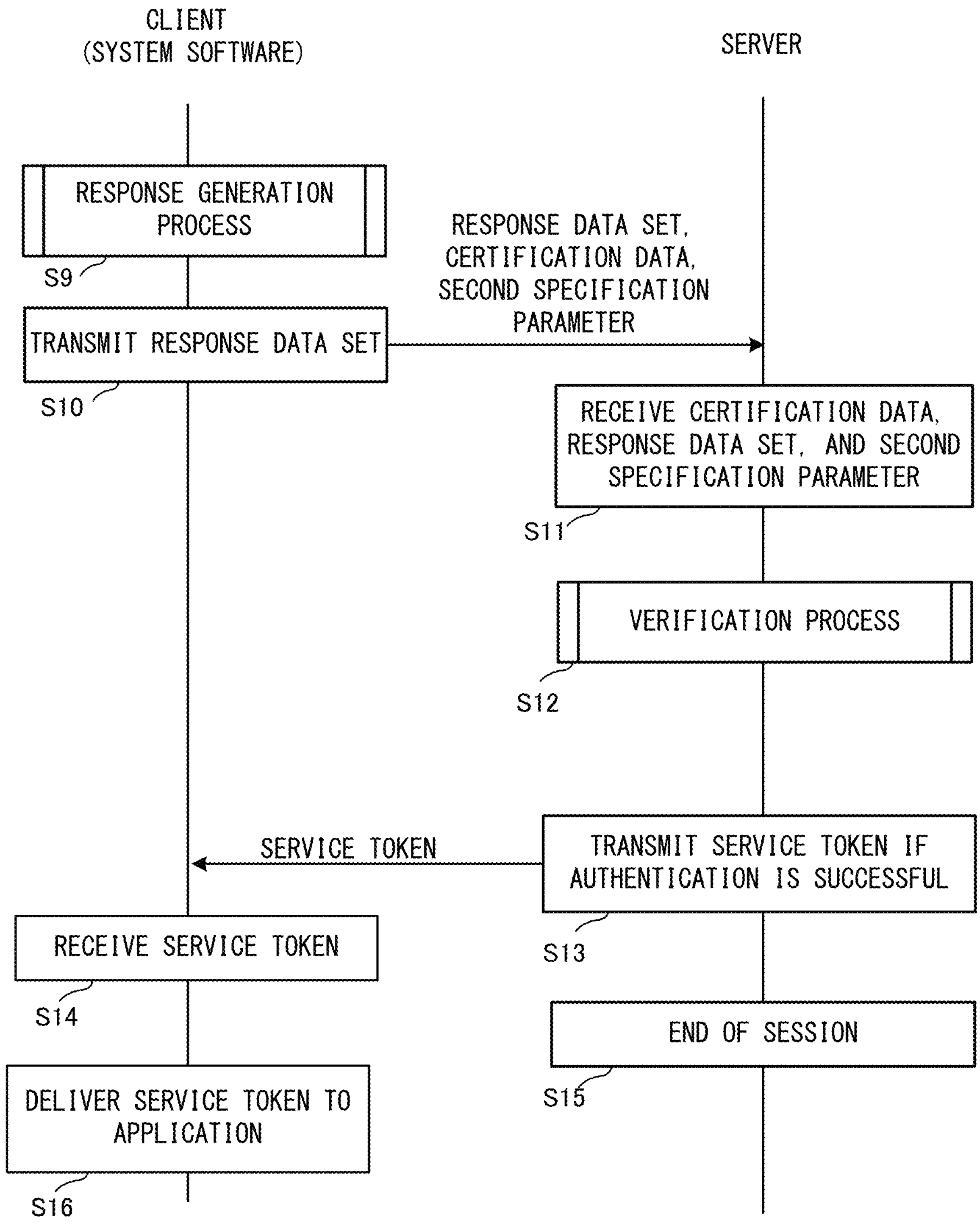
FIG. 21 is a diagram showing the details of processes in a verification session.

FIG. 21 is a diagram showing the details of processes in the verification session. First, the processing unit 31 of the client 3 that has received the challenge data set D102 executes the response generation process (step S9).

Figure 22:
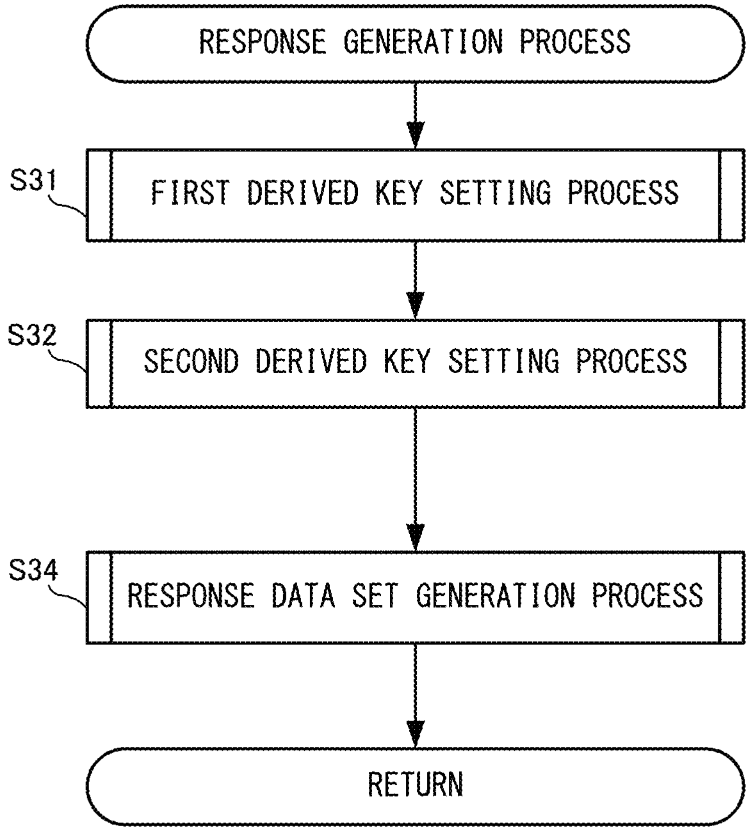
FIG. 22 is a non-limiting example flowchart showing the details of a response generation process.

FIG. 22 is a flowchart showing the details of the response generation process executed in the client 3. In FIG. 22, first, the processing unit 31 executes a first derived key setting process (step S31).

Figure 23:
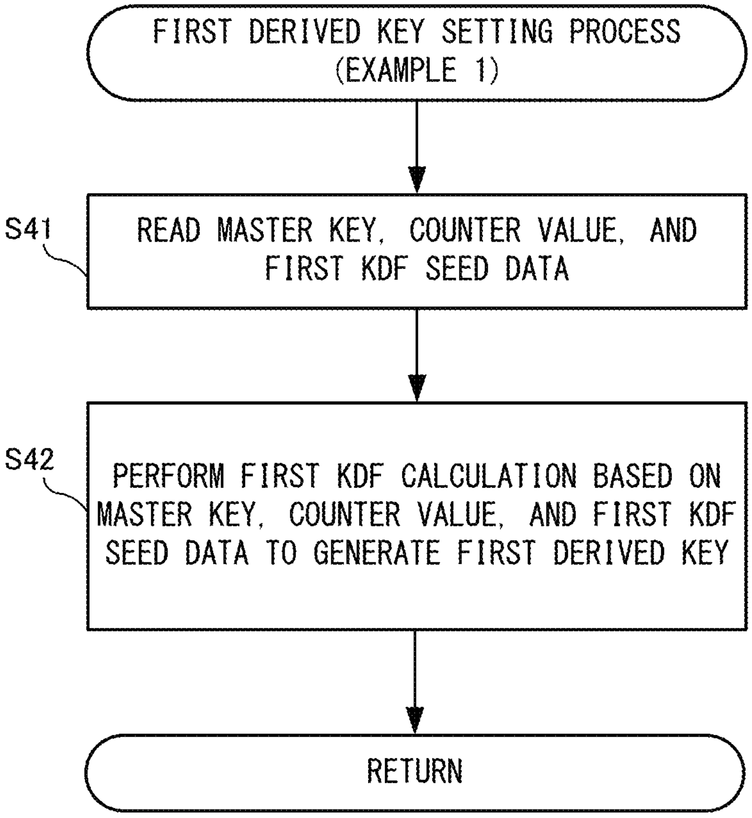
FIG. 23 is a non-limiting example flowchart showing a first example of a first derived key setting process.

FIG. 23 is a flowchart showing a first example of the above first derived key setting process. In FIG. 23, the processing unit 31 reads the master key D01, the counter value D02, and the first KDF seed data D03 from the storage unit 32 (step S41).

Next, the processing unit 31 performs calculation of the first KDF, based on the read master key D01, counter value D02, and first KDF seed data D03, to generate the first derived key D05 (step S42). Then, the first derived key setting process ends.

Figure 24:
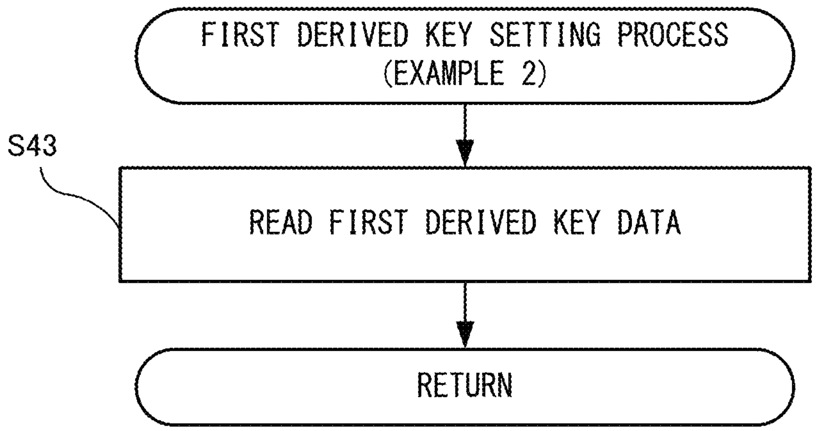
FIG. 24 is a non-limiting example flowchart showing a second example of the first derived key setting process.

The first derived key D05 that has been calculated in advance may be stored in the storage unit 32, but in the case of this mode, as the first derived key setting process, the processing unit 31 may set a first derived key by reading the first derived key data stored in advance from the storage unit 32 (step S43) as shown in FIG. 24. That is, if the first derived key D05 resulting from the first KDF calculation is stored as data in the client 3, the calculation process using the first KDF may be omitted.

Figure 25:
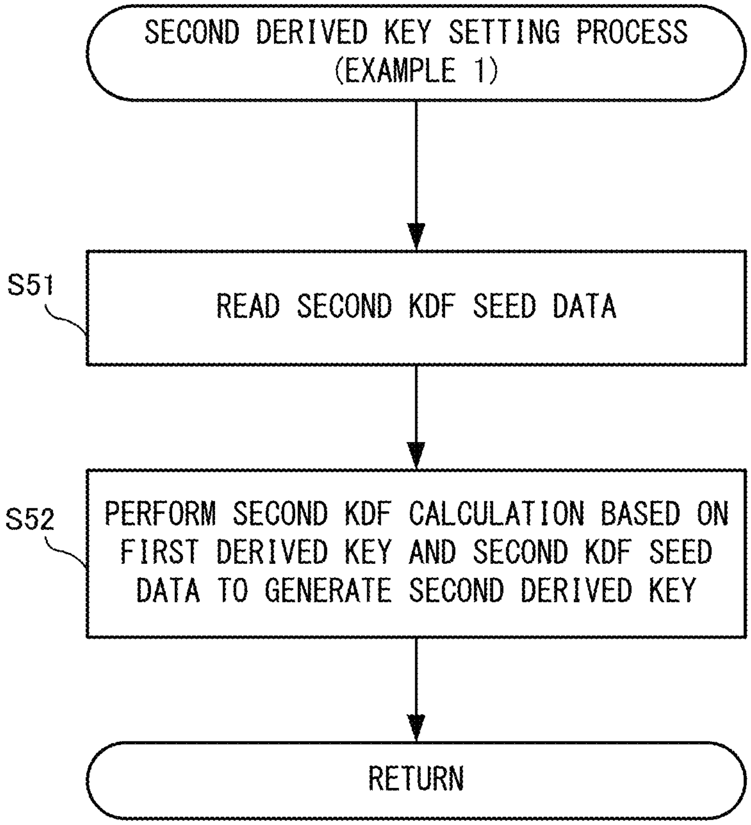
FIG. 25 is a non-limiting example flowchart showing a first example of a second derived key setting process.

Referring back to FIG. 22, next, the processing unit 31 executes a second derived key setting process (step S32). FIG. 25 is a flowchart showing a first example of the second derived key setting process. In FIG. 25, the processing unit 31 reads the second KDF seed data D04 from the storage unit 32 (step S51). Next, the processing unit 31 performs calculation of the second KDF, based on the first derived key D05 and the second KDF seed data D04, to generate the second derived key (client) D06 (step S52). Then, the second derived key setting process ends.

Figure 26:
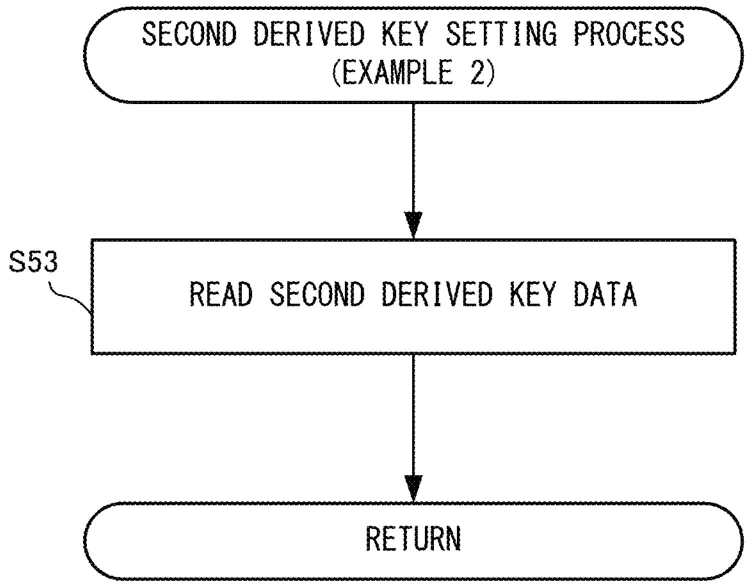
FIG. 26 is a non-limiting example flowchart showing a second example of the second derived key setting process.

The second derived key (client) D06 that has been calculated in advance may be stored in the storage unit 32, but in the case of this mode, the processing unit 31 may set a second derived key by reading the data of the second derived key (client) D06 stored in advance from the storage unit 32 (step S53) as shown in FIG. 26. That is, if the second derived key that is data resulting from the second KDF calculation is stored in the client 3, the process of the second KDF calculation may be omitted. In addition, in the case of this example, the above first derived key setting process itself may also be omitted.

In the exemplary embodiment, the second derived key (client) set by the second derived key setting process is used as the response key (client) in the response generation process.

Figure 27:
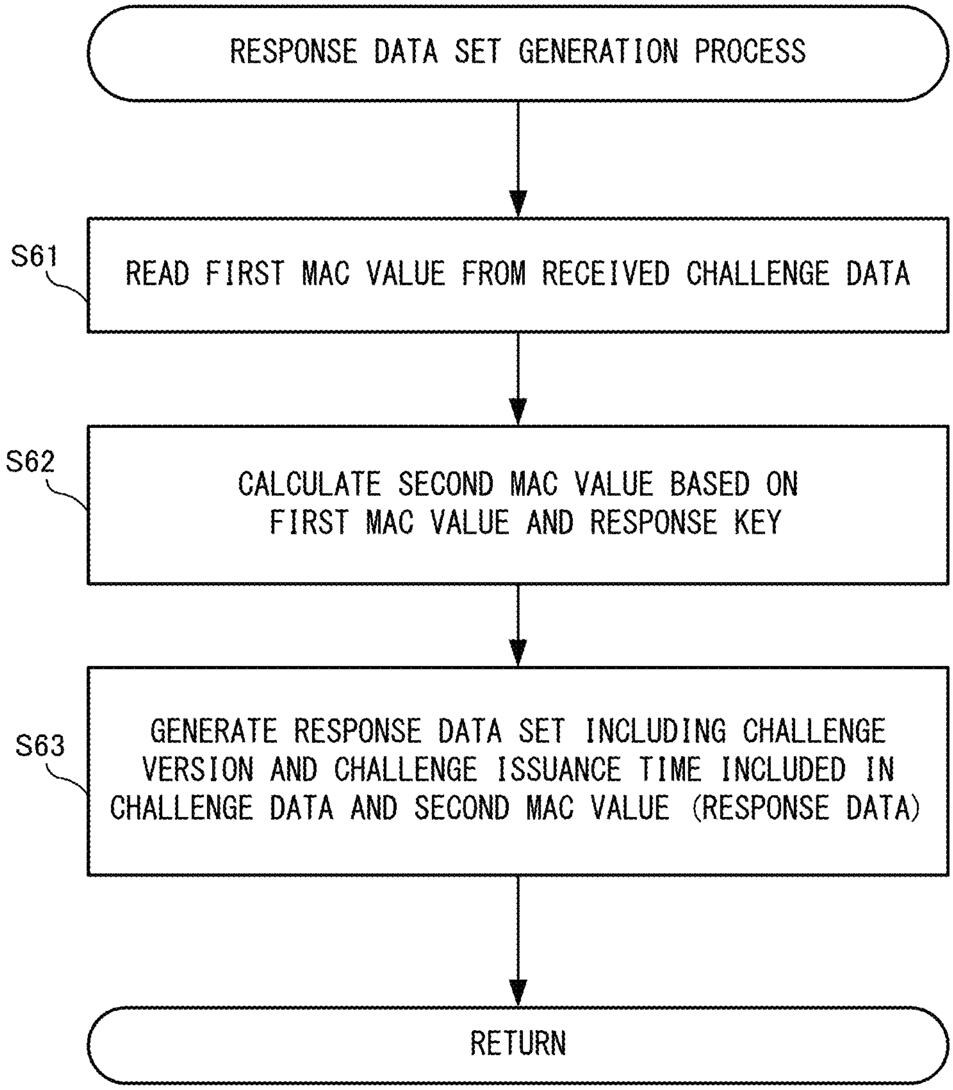
FIG. 27 is a non-limiting example flowchart showing the details of a response data set generation process.

Referring back to FIG. 22, next, the processing unit 31 executes a response data generation process (step S34). FIG. 27 is a flowchart showing the details of the response data generation process. First, the processing unit 31 reads the first MAC value (challenge data) D16 from the challenge data set D102 received in step S8 in FIG. 19 (step S61).

Next, the processing unit 31 calculates the second MAC value (response data) D17, based on the first MAC value (challenge data) D16 and the response key (client) set as described above (second derived key (client) set by the second derived key setting process) (step S62).

Next, the processing unit 31 generates the response data set D103 (see FIG. 8 above) that includes the challenge version D14 and the challenge issuance time D15 included in the challenge data set D102 received in step S8 in FIG. 21 and the second MAC value (response data) D17 calculated above (step S63). Then, the response data set generation process ends.

Here, the example in which the processes in steps S31 to S34 above are executed in sequence as the response generation process in FIG. 22 is shown. In another exemplary embodiment, as for the process of setting the response key (client) (steps S31 and S32), a response key (client) that has been calculated in advance may be stored in the storage unit 32 and may be read in step S9. For example, this process may be executed when the client 3 is started up, and the data of the response key (client) may be stored in the storage unit 32 in advance and may be read in step S9.

Referring back to FIG. 21, after the response generation process ends, the processing unit 31 establishes a session again with the server 1 (which does not have to be the same server device). Then, the processing unit 31 performs a process of transmitting a verification request and the above client transmission data D104 to the server 1 via the network communication unit 35 (step S10). That is, the response data set D103 generated in step S9 and the certification data D101 and the second specification parameter D19 read from the storage unit 32 are transmitted to the server 1. The system program (authentication function) CL201 may have a function of designating a region where the certification data D101 is stored, and the certification data D101 may be read from the region designated by this function. In addition, the response generation and transmission program may have a function of designating a region where the second specification parameter D19 is stored, and the second specification parameter D19 may be read from the region designated by this function. In addition, the system program (authentication function) CL201 may have a function of acquiring (e.g., downloading) the certification data D101 and/or the second specification parameter D19 from a predetermined server or a PC, and the acquired certification data D101 and/or second specification parameter D19 may be stored in the above designated region.

Next, the processing unit 11 of the server 1 performs a process of receiving the response data set D103, the certification data D101, and the second specification parameter D19 via the network communication unit 15 (step S11).

Figure 28:
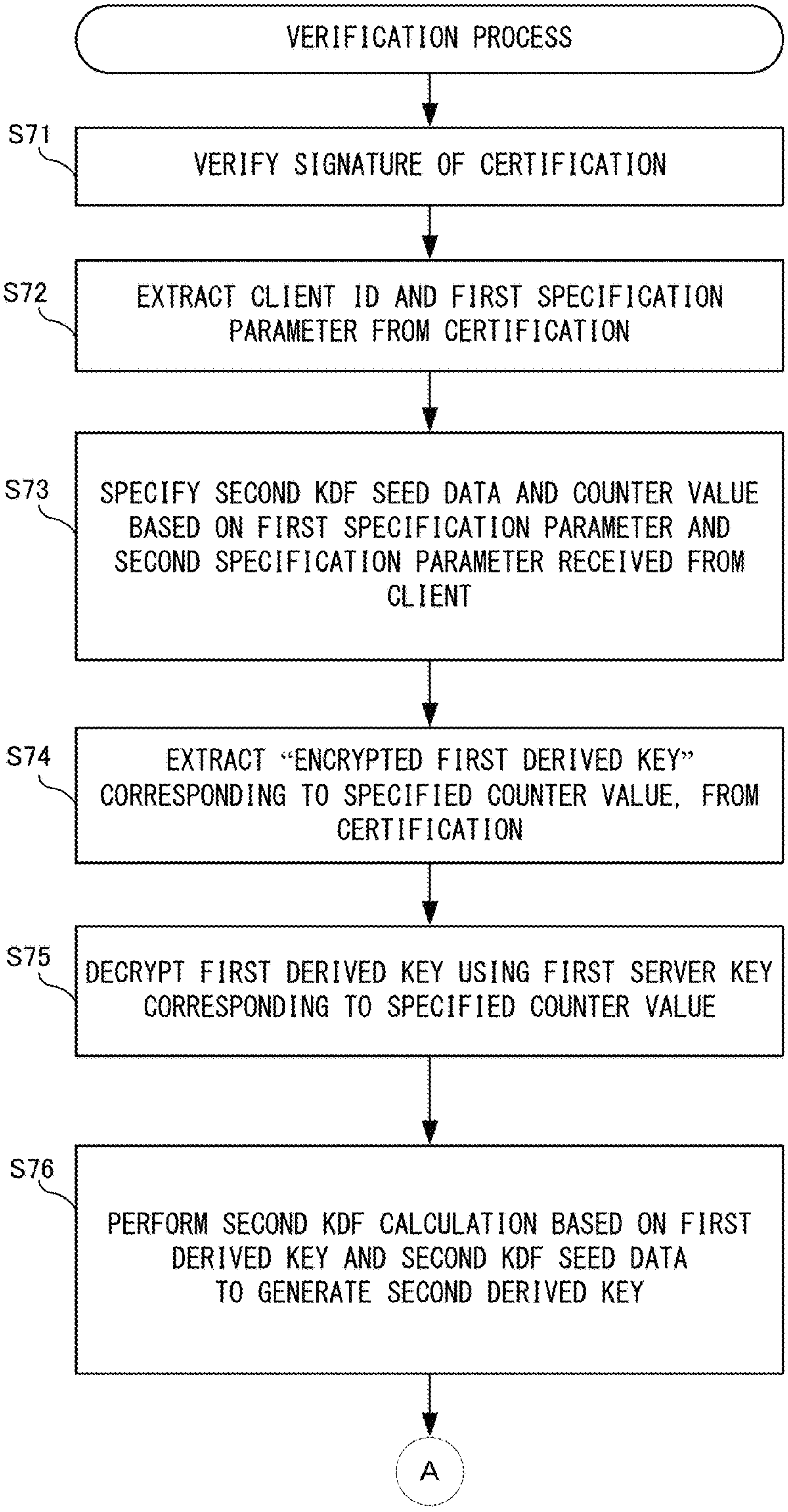
FIG. 28 is a non-limiting example flowchart showing the details of the verification process.
Figure 29:
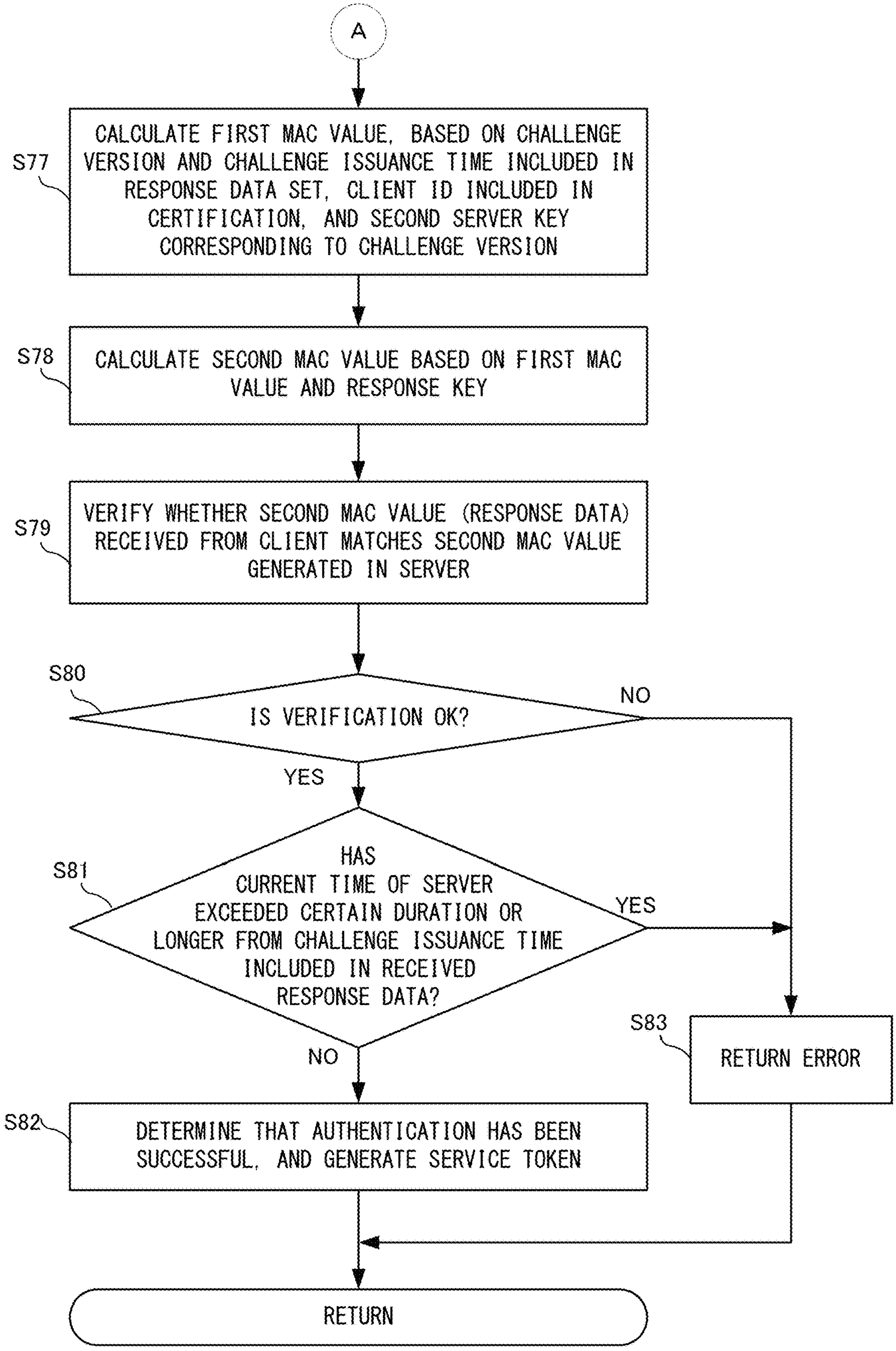
FIG. 29 is a non-limiting example flowchart showing the details of the verification process.

Next, the processing unit 11 executes a verification process (step S12). FIG. 28 and FIG. 29 are flowcharts showing the details of the verification process. In FIG. 28, first, the processing unit 11 verifies the signature D12 of the received certification data D101 (step S71). This process is the same as the process described above, and thus the detailed description thereof is omitted.

If there are no problems with the signature verification, next, the processing unit 11 extracts the first specification parameter D11 from the certification data D101 (step S72).

Next, the processing unit 11 specifies the value of the above second KDF seed data D04 by referring to the second KDF seed data specification table SV405, based on the extracted first specification parameter D11 and the second specification parameter D19 received from the client 3. In addition, the processing unit 11 specifies the counter value D02 by referring to the counter value specification table SV404, based on the first specification parameter D11 and the second specification parameter D19 (step S73).

Next, the processing unit 11 extracts the encrypted first derived key D08 corresponding to the specified counter value D02 from the certification data D101 received from the client 3 (step S74).

Next, the processing unit 11 decrypts the extracted encrypted first derived key D08 into the first derived key D05 using the first server key D07 corresponding to the counter value D02 specified above (step S75).

Next, the processing unit 11 performs calculation of the second KDF, based on the first derived key D05 and the value of the second KDF seed data D04 specified in step S73, to generate the second derived key (server) D206. The second derived key (server) D206 is used as the response key (server) (step S76). That is, the response key (server) is set by generating the second derived key D206.

Next, the processing unit 11 calculates the first MAC value (for verification) D216, based on the challenge version D14 and the challenge issuance time D15 included in the response data set D103 received in step S11, the client ID_D10 included in the certification data D101 received in step S11, and the second server key D13 corresponding to the challenge version D14 (step S77).

Next, the processing unit 11 calculates the second MAC value (for verification) D217, based on the above first MAC value (for verification) D216 and the response key (server) set in step S76 (second derived key (server) D206 generated in step S76) (step S78). A calculation algorithm in this process is the same as the algorithm for calculating the second MAC value in the client 3.

Next, the processing unit 11 verifies whether the second MAC value (response data) D17 received from the client 3 and the second MAC value (for verification) D217 calculated in the server 1 match (step S79).

Next, the processing unit 11 determines whether or not the second MAC value (response data) D17 and the second MAC value (for verification) D217 match as a result of the above verification (step S80). If the second MAC value (response data) D17 and the second MAC value (for verification) D217 do not match (NO in step S80), the processing unit 11 executes a process of returning an error to the client 3 (step S83). Then, the verification process ends. On the other hand, if the second MAC value (response data) D17 and the second MAC value (for verification) D217 match (YES in step S80), the response data D17 received from the client 3 is considered to be authentic. Since the MAC value is calculated with the client ID as a target, if the second MAC value (response data) and the second MAC value (for verification) match, it can be determined that the client to which the challenge data has been issued in the challenge issuance session and the client that has transmitted the response data D17, etc., in the verification session are the same client 3 (there is a match). It is not necessary to compare the client ID in the challenge issuance session with the client ID in the verification session.

If the result is YES in step S80, the processing unit 11 performs verification from a temporal perspective. Specifically, the processing unit 11 determines whether or not the current time of the server 1 has exceeded a certain duration or longer from the challenge issuance time D15 included in the received response data set D103. If, as a result of this determination, the current time of the server 1 has exceeded the same (YES in step S81), the processing is advanced to step S83 above, and a process of returning an error to the client 3 is executed. On the other hand, if the current time of the server 1 has not exceeded the same (NO in step S81), the processing unit 11 can confirm the authenticity of the client 3, determines that the verification has been successful, and generates a predetermined service token. Then, the response verification process ends.

In the above example, the example of the flow in which verification of the second MAC value is performed and verification from a temporal perspective is performed is shown, but the order of the verifications may be reversed.

Referring back to FIG. 21, after the response verification process ends, next, if the verification has been successful, the processing unit 11 performs a process of transmitting the predetermined service token to the client via the network communication unit 15 (step S13).

Next, the processing unit 31 of the client 3 performs a process of receiving the service token via the network communication unit 15 (step S14). Then, the response session is ended (step S15).

Next, the processing unit 31 delivers the service token to an application, in the exemplary embodiment, to an online game program (step S16). Accordingly, the online game program requests a service from a predetermined server using this service token, whereby the online game service is provided from the server.

The communication related to the challenge issuance session and the communication related to the verification session may use any communication method. For example, each of these communications may be performed as encrypted communication such as SSL or may be performed as non-encrypted communication.

Figure 30:
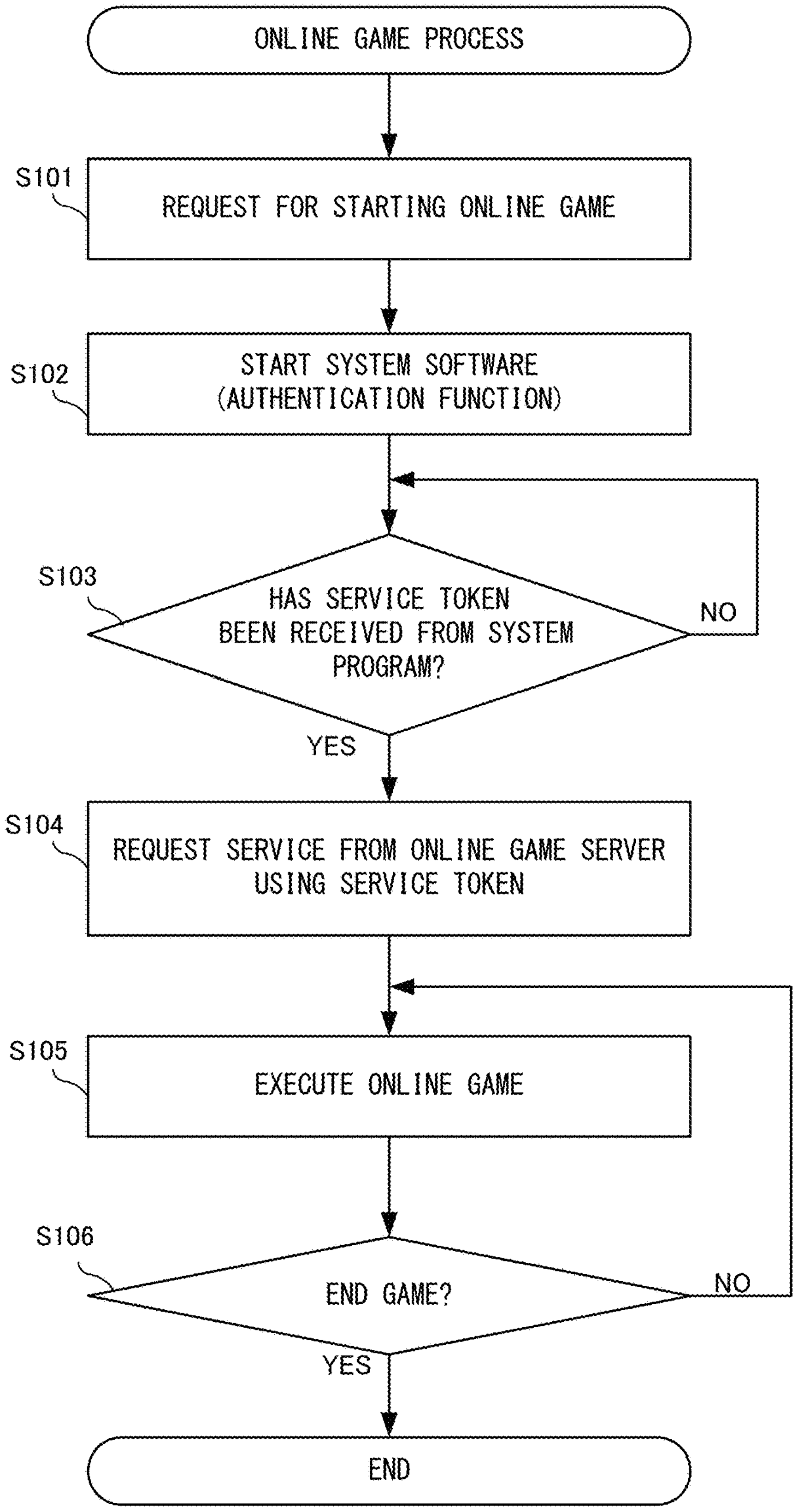
FIG. 30 is a non-limiting example flowchart showing the details of an online game process.

Next, an example of an online game process in the client 3 that uses the authentication process described above will be described using FIG. 30. In FIG. 30, first, the processing unit 31 accepts a request for starting the online game (step S101). For example, the processing unit 31 accepts an operation or the like for starting the online game from a user.

Next, the processing unit 31 starts the system software (authentication function) (step S102). Accordingly, the authentication process described above is performed.

Next, the processing unit 31 determines whether or not a service token has been received from the system software (step S103). If, as a result of this determination, a service token has not been received (NO in step S103), the processing unit 31 waits until receiving a service token.

On the other hand, if a service token has been received (YES in step S103), next, the processing unit 31 requests a service from an online game server using the received service token (step S104).

Then, the processing unit 31 executes the online game while communicating with the online game server or another client 3 if necessary (step S105). Next, the processing unit 31 determines whether or not an ending condition for the online game is satisfied (step S106). If the ending condition is not satisfied (NO in step S106), the processing unit 31 continues to execute the online game, and if the ending condition is satisfied (YES in step S106), the processing unit 31 ends the online game process.

This is the end of the detailed description of each process according to the exemplary embodiment.

[Modifications]

In another exemplary embodiment, the counter value may not necessarily be used as the seed data for the first KDF. That is, the above first KDF calculation may be performed using the above master key D01 and first KDF seed data D03 to generate the above first derived key D05. In this case, a certification includes one encrypted first derived key D05. In addition, it is needless to say that the possible values for the counter value are not limited to 0 to 3. In addition, a predetermined variable value may be used instead of a counter and may not necessarily be changed by the increment method.

In the above embodiment, the example in which the KDF calculation is used in two stages, namely, the first KDF calculation and the second KDF calculation, in the response key setting process, is shown. In another exemplary embodiment, the KDF calculation may be performed in one stage, or the number of stages of the KDF calculation may be further increased, and a result (derived key) obtained by performing further KDF calculation after the second KDF calculation may be set as the response key. As the "further KDF calculation", for example, KDF calculation may be performed with data on the volatile or non-volatile memory of the client 3 or data obtained by processing the data, as seed data. The data on the memory may be data different for each version of the system software.

In the above embodiment, in the response key setting process in the server 1, the second KDF seed data D04 is specified based on the first specification parameter D11 and the second specification parameter D19 and is used. In this respect, in another exemplary embodiment, a response key may be set without using these parameters. For example, the second KDF seed data may be specified using one parameter, or the second KDF seed data itself may be transmitted from the client 3 to the server 1. Alternatively, in the case where the second KDF seed data is common to all clients, the second KDF seed data may be stored in the server 1.

In the above embodiment, the first KDF calculation is not performed in the server 1, but the master key D01 and the first KDF seed data may be specified in the server 1, and the first KDF calculation may be performed in the server 1. In this case, the encrypted first derived key D08 in the certification data D101 is not required. In this case, data obtained by encrypting the master key D01 with the first server key may be included in the certification data D101. Then, in the server 1, the master key D01 is decrypted, and the first KDF process described above may be performed to obtain the first derived key D05.

As for the generation of the challenge data, the above example shows an example of calculating the first MAC value by performing the MAC calculation using the second server key. In another exemplary embodiment, a signature operation may be performed instead of the MAC calculation. For example, an RSA signature may be used.

As for the generation of the response data using the above response key, the response data may be generated using blocked encryption calculation instead of calculation of the above second MAC value. The blocked encryption calculation may be, for example, AES.

In another exemplary embodiment, when the client 3 transmits the response data D17, the client 3 may transmit a parameter for specifying the current value of the counter value D02 together with the response data D17. Then, the server 1 may specify the counter value D02 using the transmitted parameter and set the response key by the process described above.

In the above embodiment, the challenge issuance session and the verification session are different communication sessions, but challenge issuance and verification may be performed in a single session.

In the above embodiment, the encrypted derived key is included in the client certification, but when transmitting the response data, the encrypted derived key may be transmitted to the server separately from the client certification. The same applies to the second KDF seed data-specifying first parameter. In addition, the second KDF seed data-specifying second parameter may be included in the certification, or the certification, etc., may be transmitted with a signature additionally attached thereto.

While the present disclosure has been described in detail, the foregoing description is in all aspects illustrative and not restrictive. It is to be understood that numerous other modifications and variations can be devised without departing from the scope of the present disclosure.

(Additional Note)

It is also possible to extract the following configurations from the specific embodiments described above.

A. An information processing system comprising a client and a server connected to a network, the information processing system performing an authentication process on the client according to a challenge & response method, between the client and the server,
- the server comprising
  - one or more processors, and
  - one or more memories storing instructions that, when executed, cause the one or more processors to perform a first set of operations comprising issuing challenge data and transmitting the challenge data to the client,
- the client comprising
  - one or more processors, and
  - one or more memories storing a first parameter and instructions that, when executed, cause the one or more processors to perform a second set of operations comprising
    - receiving the challenge data,
    - generating response data from the challenge data, using a response key on the client side, and
    - transmitting the response data and the first parameter to the server,
- the first set of operations further comprising
  - receiving the response data and the first parameter,
  - specifying seed data for calculation for setting a response key on the server side, using the first parameter.
  - setting the response key on the server side by executing the calculation using the specified seed data,
  - verifying the response data using the challenge data and the response key on the server side, and
  - notifying the client of a result of the verification, and
- the second set of operations further comprising receiving the result of the verification.

B. The client in the information processing system according to A.

C. One or more non-transitory computer-readable storage media having stored therein an information processing program for causing a computer to perform the second set of operations performed by the client in the information processing system according to A.

D. The server in the information processing system according to A.

E. One or more non-transitory computer-readable storage media having stored therein an information processing program for causing a computer to perform the first set of operations performed by the server in the information processing system according to A.

What is claimed is:

1. An information processing system comprising a client and a server connected to a network, the information processing system performing an authentication process on the client according to a challenge & response method between the client and the server,
- the server comprising
  - one or more processors, and
  - one or more memories storing instructions that, when executed, cause the one or more processors to perform a first set of operations comprising issuing challenge data and transmitting the challenge data to the client,
- the client comprising
  - one or more processors, and
  - one or more memories storing a first parameter and instructions that, when executed, cause the one or more processors to perform a second set of operations comprising
    - receiving the challenge data,
    - generating response data from the challenge data, using a response key on the client side, and
    - transmitting the response data and the first parameter to the server,
- the first set of operations further comprising
  - receiving the response data and the first parameter,
  - specifying seed data for calculation for setting a response key on the server side, using the first parameter,
  - setting the response key on the server side by executing the calculation using the specified seed data,
  - verifying the response data using the challenge data and the response key on the server side, and
  - notifying the client of a result of the verification, and
- the second set of operations further comprising receiving the result of the verification.

2. The information processing system according to claim 1, wherein the second set of operations further comprise setting of the response key on the client side without using the first parameter.

3. The information processing system according to claim 1, wherein
- the first parameter is data with a signature of at least the first parameter, and
- the specifying the seed data comprises verifying the signature.

4. The information processing system according to claim 3, wherein
- a second parameter without signature is further stored in the one or more memories in the client,
- the second set of operations further comprises transmitting the second parameter to the server,
- the first set of operations further comprises receiving the second parameter, and
- the specifying the seed data comprises using the first parameter and the second parameter.

5. The information processing system according to claim 4, wherein data defining a correspondence between a combination of the first parameter and the second parameter and the seed data is further stored in the one or more memories in the server, and the specifying the seed data comprises using the defining data.

6. The information processing system according to claim 4, wherein the calculation includes a first calculation and a second calculation, calculation result data of the first calculation is further stored in the one or more memories in the client, the second set of operations further comprises transmitting the calculation result data to the server, the first set of operations further comprises receiving the transmitted calculation result data, and the setting of the response key on the server side comprises executing the second calculation using the specified seed data and the calculation result data.

7. The information processing system according to claim 6, wherein the calculation result data and the first parameter are data with a signature of at least these data, and the setting of the response key on the server side further comprises verifying the signature.

8. The information processing system according to claim 1, wherein a communication session for the authentication process between the server and the client includes a first communication session in which transmission and reception of the challenge data are performed, and a second communication session that is a communication session different from the first communication session and in which transmission and reception of the response data, verification of the response data, and transmission and reception of a result thereof are performed, and a server device for the first communication session and a server device for the second communication session are permitted to be different.

9. The information processing system according to claim 8, wherein the second set of operations further comprises transmitting the received challenge data to the server, the first set of operations further comprises receiving the challenge data, and the verifying the received response data comprises using the received challenge data and the response key on the server side.

10. The information processing system according to claim 1, wherein the first parameter is a value different depending on the client.

11. The information processing system according to claim 4, wherein the first parameter and the second parameter are values different depending on the client.

12. One or more non-transitory computer-readable storage media storing instructions that, when executed, cause a client computer in a server and client system performing an authentication process according to a challenge & response method with a server to perform operations comprising:

receiving challenge data from the server, generating response data from the challenge data using a response key on the client side;

transmitting the response data to the server, transmitting a first parameter for specifying seed data for calculation for setting a response key on the server side to the server, and receiving, from the server, an authentication result based on a result of verification of the response data performed by specifying seed data for calculation for setting the response key on the server side, based on the first parameter.

13. The one or more non-transitory computer-readable storage media according to claim 12, wherein the operations further comprises setting of the response key on the client side without using the first parameter.

14. The one or more non-transitory computer-readable storage media according to claim 12, wherein the first parameter is data with a signature of at least the first parameter.

15. The one or more non-transitory computer-readable storage media according to claim 14, wherein the operations further comprise transmitting a second parameter without signature for specifying seed data for calculation for setting a response key on the server side to the server.

16. The one or more non-transitory computer-readable storage media according to claim 15, wherein the operations further comprise transmitting a calculation result data of the first calculation to the server, the first calculation being a part of the calculation for setting a response key on the server side, and the setting of the response key on the server side comprises executing a second calculation using the specified seed data and the calculation result data, the second calculation being another part of the calculation for setting a response key on the server side.

17. The one or more non-transitory computer-readable storage media according to claim 16, wherein the calculation result data and the first parameter are data with a signature of at least these data.

18. The one or more non-transitory computer-readable storage media according to claim 12, wherein the first parameter is a value different depending on the client.

19. The one or more non-transitory computer-readable storage media according to claim 15, wherein the first parameter and the second parameter are values different depending on the client.

20. A computer-implemented method for performing, between a client and a server connected to a network, an authentication process on the client according to a challenge & response method, the computer-implemented method comprising:

the server performing operations comprising issuing challenge data and transmitting the challenge data to the client, the client performing operations comprising receiving the challenge data, generating response data from the challenge data, using a response key on the client side, and transmitting the response data and a first parameter to the server, the server further performing operations comprising receiving the response data and the first parameter, specifying seed data for calculation for setting a response key on the server side, using the first parameter, setting a response key on the server side by executing the calculation using the specified seed data, verifying the response data using the challenge data and the response key on the server side, and notifying the client of a result of the verification, and the client further performing operations comprising receiving the result.

* * * * *